US012133169B2

(12) United States Patent
Yang et al.

(10) Patent No.: US 12,133,169 B2
(45) Date of Patent: Oct. 29, 2024

(54) METHOD AND DEVICE FOR COMMUNICATION OF SIGNAL

(71) Applicant: DATANG MOBILE COMMUNICATIONS EQUIPMENT CO., LTD., Beijing (CN)

(72) Inventors: Meiying Yang, Beijing (CN); Deshan Miao, Beijing (CN); Jinhua Miao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 187 days.

(21) Appl. No.: 17/059,657

(22) PCT Filed: May 14, 2019

(86) PCT No.: PCT/CN2019/086917
§ 371 (c)(1),
(2) Date: Nov. 30, 2020

(87) PCT Pub. No.: WO2019/228186
PCT Pub. Date: Dec. 5, 2019

(65) Prior Publication Data
US 2021/0219232 A1 Jul. 15, 2021

(30) Foreign Application Priority Data

May 31, 2018 (CN) .......................... 201810553802.3

(51) Int. Cl.
*H04W 52/02* (2009.01)
*H04B 17/318* (2015.01)
(Continued)

(52) U.S. Cl.
CPC ...... *H04W 52/0229* (2013.01); *H04B 17/318* (2015.01); *H04B 17/336* (2015.01);
(Continued)

(58) Field of Classification Search
CPC ............. H04W 52/0229; H04W 24/10; H04W 72/042; H04W 72/0453; H04W 76/27;
(Continued)

(56) References Cited

U.S. PATENT DOCUMENTS

2013/0294312 A1    11/2013   Chen et al.

FOREIGN PATENT DOCUMENTS

CN        102036346 A      4/2011
CN        107360619 A     11/2017
(Continued)

OTHER PUBLICATIONS

English translation of WO-2018086067-A1, retrieved from PE2E Search Jul. 30, 2022. (Year: 2018).*
(Continued)

*Primary Examiner* — Omar J Ghowrwal
(74) *Attorney, Agent, or Firm* — Meunier Carlin & Curfman LLC

(57) ABSTRACT

The present application discloses a method and a device for transmitting and receiving a signal. In the embodiment of the present application, a network side device sends a wake-up signal over a first object, where the wake-up signal includes information for instructing the terminal to receive and/or detect a downlink signal over the object, the network side device sends the downlink signal over the object, and the terminal receives and/or detects the downlink signal according to the information in the wake-up signal.

17 Claims, 11 Drawing Sheets

(51) Int. Cl.

| | |
|---|---|
| *H04B 17/336* | (2015.01) |
| *H04L 5/00* | (2006.01) |
| *H04W 24/02* | (2009.01) |
| *H04W 24/08* | (2009.01) |
| *H04W 24/10* | (2009.01) |
| *H04W 72/0453* | (2023.01) |
| *H04W 72/23* | (2023.01) |
| *H04W 76/27* | (2018.01) |

(52) U.S. Cl.
CPC ............ *H04L 5/001* (2013.01); *H04L 5/0053* (2013.01); *H04L 5/0091* (2013.01); *H04W 24/02* (2013.01); *H04W 24/08* (2013.01); *H04W 24/10* (2013.01); *H04W 52/0212* (2013.01); *H04W 52/0235* (2013.01); *H04W 72/0453* (2013.01); *H04W 72/23* (2023.01); *H04W 76/27* (2018.02); *Y02D 30/70* (2020.08)

(58) Field of Classification Search
CPC . H04W 52/0235; H04W 24/02; H04W 24/08; H04W 52/0212; H04B 17/318; H04B 17/336; H04L 5/0091; H04L 5/0053; H04L 5/001; Y02D 30/70

See application file for complete search history.

(56) References Cited

FOREIGN PATENT DOCUMENTS

| | | | |
|---|---|---|---|
| TW | I528772 B | 4/2016 | |
| WO | 2016146147 A1 | 9/2016 | |
| WO | WO-2016197829 A1 * | 12/2016 | ............ H04W 16/10 |
| WO | 2018017008 A1 | 1/2018 | |
| WO | 2018063673 A1 | 4/2018 | |
| WO | 2018063673 A9 | 4/2018 | |
| WO | WO-2018086067 A1 * | 5/2018 | ............. H04L 5/001 |

OTHER PUBLICATIONS

English translation of WO-2016197829-A1, retrieved from PE2E Search Jul. 30, 2022. (Year: 2016).*
Mediatek Inc. "Miscellaneous Issues of NB-IOT Wake up Signal," 3GPP TSG-RAN WG2 Meeting #101bis R2-1805101, Sanya, China, Apr. 20, 2018.
Nokia et al. "Wake-Up Signal Configurations and Procedures," 3GPP TSG RAN WGI Meeting #92bis R1-1804249, Sanya, China, Apr. 20, 2018.
Apple, "NR UE Power Saving," 3GPP TSG-RAN Meeting #97 R1-180459, Mar. 23, 2018.
International Search Report for International Application No. PCT/CN2019/086917 dated Aug. 1, 2019.
Qualcomm Incorporated, "Advanced Grant Indication for UE Power Saving," 3GPP TSG RAN WG1 #91, R1-1720709, Agenda Item 7.3.1.5, Reno, NV, USA, Nov. 27-Dec. 1, 2017.

* cited by examiner

METHOD AND DEVICE FOR COMMUNICATION OF SIGNAL

The present application is a US National Stage of International Application No. PCT/CN2019/086917, filed on May 14, 2019, which claims benefit of priority to Chinese Application No. 201810553802.3 filed on May 31, 2018 in the Chinese Patent Office and entitled "METHOD AND DEVICE FOR TRANSMITTING AND RECEIVING SIGNAL", the entire contents of which are incorporated herein by reference.

FIELD

The present application relates to the technical field of wireless communication, and in particular to a method and a device for transmitting and receiving a signal.

BACKGROUND

With the development of a wireless communication technology, terminal types and service types are diversified, and the requirements for saving terminal power, saving network resource and satisfying various service types coexist. In order to ensure terminal power saving and service reachability at the same time, a wake-up signal (WUS) is introduced. When a terminal monitors the WUS, power consumption is relatively low. When the terminal receives the WUS, the terminal is woken up by the WUS, and then a communication module is started to receive a downlink signal transmitted from a network side, such as a paging signal, a physical downlink control channel (PDCCH) signal, a radio resource management (RRM) measurement signal, and a synchronization signal, thus achieving the purpose of saving terminal power.

FIG. 1 illustrates a schematic diagram of a terminal receiving a wake-up signal in an idle state. FIG. 2 illustrates a schematic diagram of a terminal receiving a wake-up signal in a connected state. When the terminal is in the idle state/connected state, the terminal enters a sleep state with extremely low power. When a downlink signal is transmitted to the terminal from a network side, the network side device transmits a wake-up signal to the terminal, and the terminal is woken up after receiving the wake-up signal transmitted by the network side device and starts to perform signal transmission with the network side. When the signal transmission is finished, the terminal enters the sleep state with extremely low power again.

At present, a transmitting carrier of the WUS, a receiving carrier of the terminal that needs to be woken up, and data reception of the wake-up terminal instructed by the WUS are all on a same carrier.

A multi-carrier technology (e.g. a carrier aggregation (CA) technology), a dual-connection (DC) technology and a bandwidth part (BWP) technology are currently commonly used technologies for multiple communication systems. When there are multiple carriers or bandwidths, a WUS can be transmitted on each carrier or bandwidth, and the terminal that needs to be woken up receives the WUS on each carrier or bandwidth, and the WUS on each carrier or bandwidth is used to instruct possible signal reception of the terminal on each carrier or bandwidth. If transmission resources of the WUS need to be configured on each carrier or bandwidth, resource waste will be caused. If resources occupied by the WUS of each terminal are distributed on each carrier or bandwidth, total frequency spectrum resources available in a downlink will be discontinuous. If the terminal needs to receive and/or detect the WUS on each carrier or bandwidth, power consumption of the terminal will increase. In hybrid networking of licensed and unlicensed spectra, on an unlicensed spectrum, due to the limitation of regional laws and regulations, any signal needs to be monitored before being transmitted, and a channel can only be used on the premise that no other transmission is monitored, resulting in the situation where the WUS cannot be guaranteed for transmission, and omission of receiving and/or detecting a downlink signal is caused.

Therefore, at present, when there are multiple carriers or bandwidths, a WUS needs to be configured on each carrier or bandwidth, resulting in resource waste, total spectrum resources available in the downlink being discontinuous, increased terminal power consumption, and omission of receiving and/or detecting a downlink signal.

SUMMARY

The present application provides a method and a device for transmitting and receiving a signal, which are used for solving the problems in the prior art, i.e. when there are multiple carriers or bandwidths, and a network side and a terminal perform signal transmission, resources are wasted, total spectrum resources available in a downlink are discontinuous, and power consumption of the terminal is increased; and on an unlicensed spectrum, when other signals are transmitted on a channel, a WUS signal cannot be transmitted, which causes omission of receiving and/or detecting a downlink signal.

In a first aspect, a method for transmitting a signal according to an embodiment of the present application includes: transmitting, by a network side device, a wake-up signal over at least one first object, wherein the wake-up signal includes information for instructing at least one terminal to receive and/or detect a downlink signal over the first object and/or at least one second object; and transmitting, by the network side device, the downlink signal over the first object and/or the at least one second object, wherein the first object and the second object are different, and the object is a carrier or a bandwidth.

According to the above method, because the network side device transmits a wake-up signal over at least one first object, the wake-up signal includes information for instructing at least one terminal to receive and/or detect a downlink signal over the first object and/or a second object, and the object includes a carrier or a bandwidth, after the first object receives the wake-up signal transmitted by the network side device, the terminal receives and/or detects the downlink signal over the first object and/or the second object according to instruction in the wake-up signal. Therefore, when there are multiple carriers or bandwidths, a WUS does not need to be configured on each carrier or bandwidth. Instead, the WUS is transmitted over one carrier or bandwidth, and information for instructing one or more terminals to receive and/or detect a downlink signal over one or more carriers or bandwidths is placed in the WUS, thereby reducing resource waste, making total spectrum resources available in the downlink to be continuous, reducing terminal power consumption, and avoiding omission of receiving and/or detecting a downlink signal.

In one possible implementation, if the object is the carrier, a set of all available receiving carriers configured by the network side device to the terminal includes at least one first carrier and/or at least one second carrier. If the object is the bandwidth, a set of all available receiving bandwidths configured by the network side device to the terminal includes at least one first bandwidth and/or at least one second bandwidth.

According to the above method, for the network side device side, the first carrier or the first bandwidth is configured to transmit a wake-up signal or downlink signal, and the second carrier or the second bandwidth is configured to transmit a downlink signal. Therefore, when the terminal side and the network side device perform signal transmission, and if the object is a carrier, a set of all available receiving carriers configured by the network side device to the terminal includes at least one first carrier and/or at least one second carrier. If the object is a bandwidth, a set of all available receiving bandwidths configured by the network side device to the terminal includes at least one first bandwidth and/or at least one second bandwidth.

In one possible implementation, the first carrier is a primary carrier of the at least one terminal, wherein the primary carrier may be predefined, or statically configured by the network side device, or semi-statically configured by the network side device, or dynamically configured by the network side device; or the first carrier is a secondary carrier of the at least one terminal, wherein the secondary carrier may be predefined, or statically configured by the network side device, or semi-statically configured by the network side device, or dynamically configured by the network side device; or the first carrier is at least one carrier where a licensed spectrum is located, wherein the at least one carrier may be predefined, or statically configured by the network side device, or semi-statically configured by the network side device, or dynamically configured by the network side device; or the first carrier is at least one carrier where an unlicensed spectrum is located, wherein the at least one carrier may be predefined, or statically configured by the network side device, or semi-statically configured by the network side device, or dynamically configured by the network side device.

In one possible implementation, the first bandwidth is an initial access bandwidth of the at least one terminal, wherein the initial access bandwidth may be predefined, or statically configured by the network side device, or semi-statically configured by the network side device, or dynamically configured by the network side device; or the first bandwidth is a partial bandwidth of an available bandwidth of the at least one terminal, wherein the partial bandwidth of the available bandwidth may be predefined, or statically configured by the network side device, or semi-statically configured by the network side device, or dynamically configured by the network side device; or the first bandwidth is a total bandwidth of an available bandwidth of the at least one terminal, wherein the total bandwidth of the available bandwidth may be predefined, or statically configured by the network side device, or semi-statically configured by the network side device, or dynamically configured by the network side device.

According to the above two methods, when the first object is the first carrier or the first bandwidth, a mode of the first carrier or the first bandwidth is selected. After the first carrier or the first bandwidth is determined, the network side device transmits a wake-up signal or a downlink signal over the determined first carrier or first bandwidth.

In one possible implementation, the static configuration or the semi-static configuration is configured by the network side device via RRM control information, and the dynamic configuration is configured by the network side device via downlink control information.

According to the above method, configuration modes of the static configuration, the semi-static configuration and the dynamic configuration are respectively explained.

In one possible implementation, the network side device may configure a first carrier or a first bandwidth for the terminal in a randomly selected manner, and may also configure the first carrier or the first bandwidth for the terminal according to a RRM measurement result.

According to the above method, the network side device configures the first carrier or the first bandwidth for the terminal in two modes, i.e. configuration can be randomly selected, and configuration can also be performed according to a RRM measurement result.

In one possible implementation, the RRM measurement result includes one of following measurement results: a measurement result of a reference signal received power, a measurement result of a reference signal received quality, a measurement result indicated by a received signal strength, or a measurement result of a signal interference-to-noise ratio.

The above method describes the radio resource measurement result, which may be the measurement result of the reference signal received power, the measurement result of the reference signal received quality, the measurement result indicated by the received signal strength, or the measurement result of the signal interference-to-noise ratio. When the network side device configures the first carrier or the first bandwidth for the terminal, configuration can be performed according to the RRM measurement result.

In one possible implementation, if the network side device configures the first carrier or the first bandwidth for the terminal according to the RRM measurement result, the network side device may configure the first carrier or the first bandwidth for the terminal according to a value in the radio resource measurement result, and may also configure the first carrier or the first bandwidth for the terminal according to a result of comparing the RRM measurement result with a threshold value.

The above method provides two modes in which the network side device configures the first carrier or the first bandwidth for the terminal according to the RRM measurement result.

In one possible implementation, after the network side device determines the first object, the method further includes: transmitting, by the network side device, object information of the determined first object to the terminal.

According to the above method, after determining the first object, the network side device transmits the object information of the determined first object to the terminal, so that the terminal receives a wake-up signal over the first object.

In a second aspect, a method for receiving a signal according to an embodiment of the present application includes: firstly entering, by a terminal in a sleep state, a wake-up state after receiving a wake-up signal transmitted by a network side device over a first object, and then receiving and/or detecting, by the terminal, a downlink signal over the first object and/or at least one second object, according to information, for instructing the terminal to receive and/or detect the downlink signal over the first object and/or at least one second object, in the received wake-up signal; wherein the first object and the second object are different, and the object is a carrier or a bandwidth.

According to the above method, because the wake-up signal includes the information for instructing the terminal to receive and/or detect the downlink signal over the first object and/or the at least one second object, after receiving the wake-up signal over the first object, the terminal receives the downlink signal over the first object and/or the at least one second object according to the information in the wake-up signal. Therefore, when there are multiple carriers or bandwidths, a WUS does not need to be configured on each carrier or bandwidth, thereby reducing resource waste, making total spectrum resources available in the downlink to be continuous, reducing terminal power consumption, and avoiding omission of receiving and/or detecting a downlink signal.

In one possible implementation, if the object is the carrier, a set of all available receiving carriers configured by the network side device to the terminal includes at least one first carrier and/or at least one second carrier. If the object is the bandwidth, a set of all available receiving bandwidths configured by the network side device to the terminal includes at least one first bandwidth and/or at least one second bandwidth.

According to the above method, for the terminal side, the first carrier or the first bandwidth is used to receive a wake-up signal or receive and/or detect a downlink signal, and the second carder or the second bandwidth is used to receive and/or detect the downlink signal. Therefore, when the terminal side and the network side device perform signal transmission, if the object is a carrier, a set of all available receiving carriers configured by the network side device to the terminal includes at least one first carrier and/or at least one second carrier; If the object is a bandwidth, a set of all available receiving bandwidths configured by the network side device to the terminal includes at least one first bandwidth and/or at least one second bandwidth.

In one possible implementation, the first carrier is a primary carrier of the terminal, wherein the primary carrier is predefined, or statically configured by the network side device, or semi-statically configured by the network side device, or dynamically configured by the network side device; or the first carrier is a secondary carrier of the terminal, wherein the secondary carrier is predefined, or statically configured by the network side device, or semi-statically configured by the network side device, or dynamically configured by the network side device; or the first carrier is at least one carrier where a licensed spectrum is located, wherein the at least one carrier is predefined, or statically configured by the network side device, or semi-statically configured by the network side device, or dynamically configured by the network side device; or the first carrier is at least one carrier where an unlicensed spectrum is located, wherein the at least one carrier is predefined, or statically configured by the network side device, or semi-statically configured by the network side device, or dynamically configured by the network side device.

In one possible implementation, the first bandwidth is an initial access bandwidth of the terminal, wherein the initial access bandwidth is predefined, or statically configured by the network side device, or semi-statically configured by the network side device, or dynamically configured by the network side device; or the first bandwidth is a partial bandwidth of an available bandwidth of the terminal, wherein the partial bandwidth of the available bandwidth is predefined, or statically configured by the network side device, or semi-statically configured by the network side device, or dynamically configured by the network side device; or the first bandwidth is a total bandwidth of the available bandwidth of the terminal, wherein the total bandwidth of the available bandwidth is predefined, or statically configured by the network side device, or semi-statically configured by the network side device, or dynamically configured by the network side device.

According to the above two methods, when the first object is the first carrier or the first bandwidth, a mode of the first carrier or the first bandwidth is selected. After the first carrier or the first bandwidth is determined, the terminal receives a wake-up signal or receives and/or detects a downlink signal over the first carrier or the first bandwidth.

In one possible implementation, the static configuration or the semi-static configuration is configured by the network side device via radio resource control information, and the dynamic configuration is configured by the network side device via downlink control information.

According to the above method, configuration modes of the static configuration, the semi-static configuration and the dynamic configuration are respectively explained.

In one possible implementation, the terminal determines the first object in one of following manners:
 the terminal determines the first object in the set of all available receiving carriers of the terminal according to received object information transmitted by the network side device; or
 the terminal determines the first object in the set of all available receiving bandwidths of the terminal according to received object information transmitted by the network side device.

According to the above method, because the object information received by the terminal and transmitted by the network side device is information of the first object, the terminal determines the first object in the set of all available receiving carriers or bandwidths of the terminal according to the object information, so as to receive the wake-up signal transmitted by the network side device over the first object.

In a third aspect, an embodiment of the present application further provides a device for transmitting a signal, and the device includes: at least one processing unit and at least one storage unit, wherein the storage unit stores a program code, and when the program code is executed by the processing unit, the processing unit executes following processes: transmitting a wake-up signal over at least one first object, wherein the wake-up signal includes information for instructing at least one terminal to receive and/or detect a downlink signal over the first object and/or at least one second object; and transmitting the downlink signal over the first object and/or the at least one second object, wherein the first object and the second object are different, and the object is a carrier or a bandwidth.

In a fourth aspect, an embodiment of the present application further provides a device for receiving a signal, and the device includes: at least one processing unit and at least one storage unit, wherein the storage unit stores a program code, and when the program code is executed by the processing unit, the processing unit executes following processes:
 entering a wake-up state after receiving a wake-up signal transmitted by a network side device over a first object; and receiving and/or detecting a downlink signal over the first object and/or at least one second object, according to information, for instructing the terminal to receive and/or detect the downlink signal over the first object and/or at least one second object, in the wake-up signal; wherein the first object and the second object are different, and the object is a carrier or a bandwidth.

In a fifth aspect, an embodiment of the present application further provides a device for transmitting a signal, and the device includes:

a wake-up signal transmitting module, configured to transmit a wake-up signal over at least one first object, wherein the wake-up signal includes information for instructing at least one terminal to receive and/or detect a downlink signal over the first object and/or at least one second object; and a downlink signal transmitting module, configured to transmit the downlink signal over the first object and/or at least one second object, wherein the first object and the second object are different, and the object is a carrier or a bandwidth.

In a sixth aspect, an embodiment of the present application further provides a device for receiving a signal, and the device includes:

a wake-up module, configured to enter a wake-up state after receiving a wake-up signal transmitted by a network side device over a first object; and a receiving and detecting module, configured to receive and/or detect a downlink signal over the first object and/or at least one second object according to information, for instructing the terminal to receive and/or detect the downlink signal over the first object and/or at least one second object, in the wake-up signal; wherein the first object and the second object are different, and the object is a carrier or a bandwidth.

In a seventh aspect, the present application further provides a computer storage medium having stored thereon a computer program, and the computer program, when executed by a processor, implements the steps of the method according to the first aspect or second aspect.

Further, the technical effects of any one of the implementations of the third aspect to the seventh aspect can be seen from the technical effects of the different implementations of the first aspect and the second aspect, and will not be described in detail herein.

BRIEF DESCRIPTION OF THE DRAWINGS

In order to more clearly illustrate the technical solution in the embodiments of the present application, a brief description will be given below of the drawings which are required for the description of the embodiments. Obviously, the drawings in the following description are only some embodiments of the present application, and it is also possible for those of ordinary skill in the art to derive other drawings from these drawings without involving any inventive effort.

DETAILED DESCRIPTION OF THE EMBODIMENTS

Hereinafter, some terms in the embodiments of the present application will be explained to facilitate the understanding of those skilled in the art.

(1) In the embodiments of the present application, the term "object" is a "carrier" or "bandwidth".

(2) In the embodiments of the present application, the term "bandwidth" refers to a frequency range occupied by signal transmission.

(3) The term "multiple" in the embodiments of the present application refers to two or more, and other quantifiers are similar.

(4) The term "and/or" describes an association relationship of associated objects, indicating that there can be three types of relationships, for example, A and/or B can represent three cases of A alone, A and B together, and B alone. The symbol "/" generally indicates that the associated objects are in an "or" relationship.

In order to meet the requirements of single user peak rate and system capacity improvement, one of the most direct methods is to increase the system transmission bandwidth, so a technology for increasing the transmission bandwidth is introduced, such as a CA technology and a DC technology.

Figure 1:
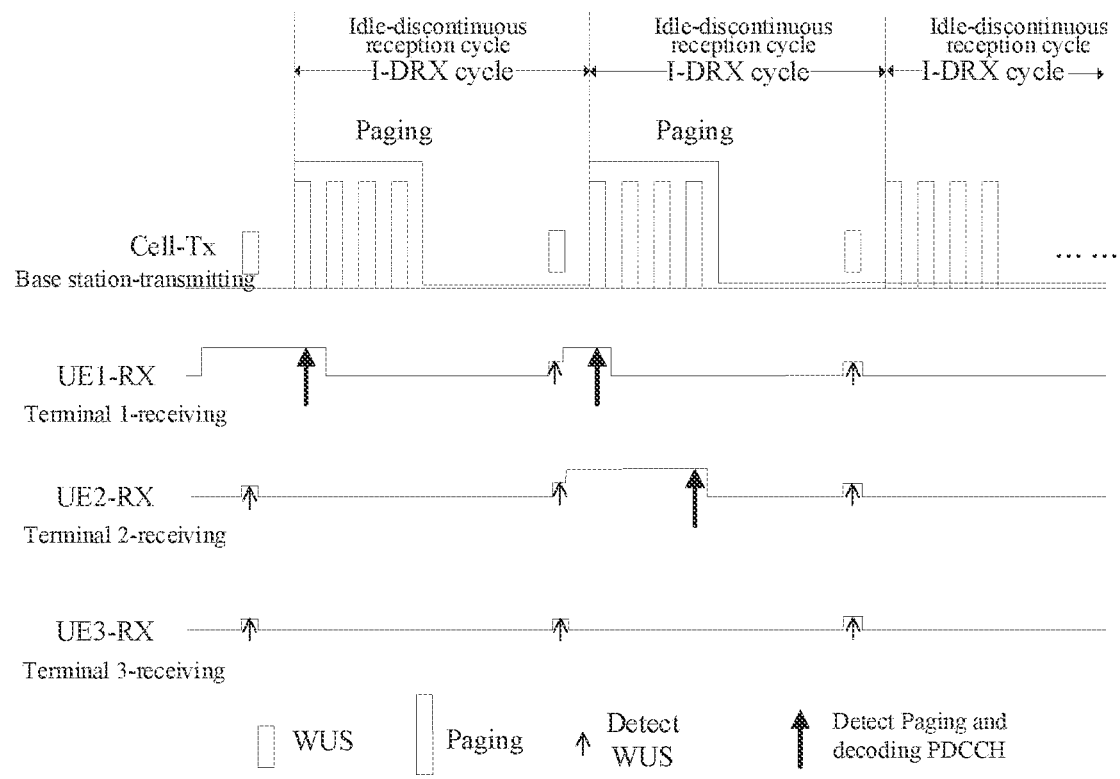
FIG. 1 illustrates a schematic diagram of a terminal receiving a wake-up signal in an idle state in the background art.
Figure 2:
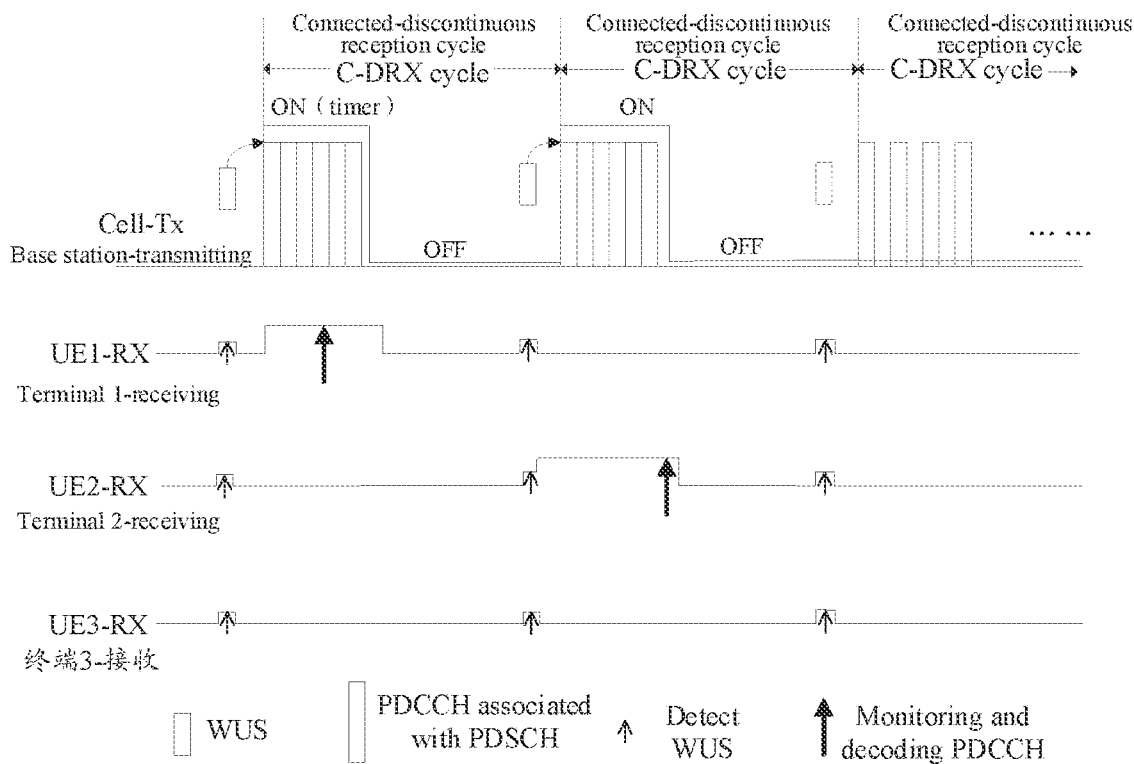
FIG. 2 illustrates a schematic diagram of a terminal receiving a wake-up signal in a connected state in the background art.
Figure 3:
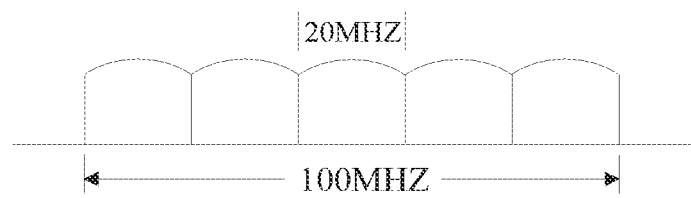
FIG. 3 illustrates a schematic diagram of multi-carrier aggregation.

The CA/DC technology can aggregate multiple carriers (Component Carrier, CC) together to achieve the purpose of increasing the transmission bandwidth, thereby effectively increasing the uplink and downlink transmission rate. FIG. 3 illustrates a schematic diagram of multi-carrier aggregation. In FIG. 3, there are 5 carriers in total, each carrier has a transmission bandwidth of 20 MHZ, and the 5 carriers with a bandwidth of 20 MHZ are combined together to form a transmission bandwidth with a bandwidth of 100 MHZ, so that the transmission rate of uplink and downlink data can be effectively increased.

In the carrier aggregation technology, a terminal determines how many carriers at most can be simultaneously utilized for uplink and downlink transmission according to the capacity of the terminal itself.

A BWP technology sometimes is also referred to as Bandwidth Adaptation.

Figure 4:
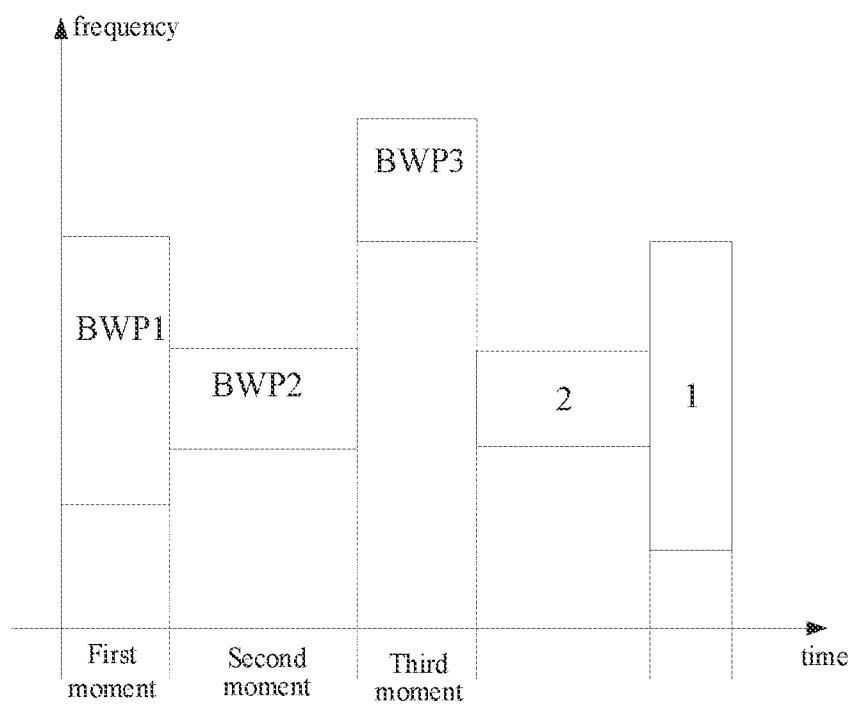
FIG. 4 illustrates a schematic diagram of dynamic variation in terminal bandwidths.

In new radio (NR), the bandwidth of a terminal may vary dynamically according to the traffic volume of the terminal, FIG. 4 illustrates a schematic diagram of dynamic variation in terminal bandwidths. In FIG. 4, at a first moment, the traffic volume of the terminal is large, and the system configures a large bandwidth (BWP1) for the terminal; at a second moment, the traffic volume of the terminal is small, and the system configures a small bandwidth (BWP2) for the terminal to meet basic communication requirements; at a third moment, the system discovers that there is a wide range of frequency selectively fading in the bandwidth of BWP1, or resources are scarce in the frequency range of BWP1, so a new bandwidth (BWP3) is configured for the terminal.

It can be seen from the above that there are multiple carriers in the CA/DC technology and multiple bandwidths in the BWP technology. When there are multiple carriers or multiple bandwidths, under the premise of saving power for the terminal, when the terminal and the network side perform data communication, the problems of resource waste, total spectrum resources available in the downlink being discontinuous, high terminal power consumption, and omission of receiving and/or detecting a downlink signal are the problems to be solved by the embodiments of the present application.

In order to save power, when no downlink signal is received, the terminal is in a sleep state, namely a low power state, when the network side device has a downlink signal for transmission to the terminal, the network side device firstly transmits a wake-up signal to the terminal, wakes up the terminal and then transmits the downlink signal to the terminal; and the terminal is woken up after receiving the wake-up signal, and then the terminal receives the downlink signal transmitted by the network side device.

In order to avoid configuring a wake-up signal on each carrier or bandwidth under a multi-carrier or multi-bandwidth condition, firstly, the network side device determines a first object and transmits object information of the determined first object to a terminal, and simultaneously transmits a wake-up signal over the first object, wherein the object is a carrier or a bandwidth, and the wake-up signal includes information for instructing at least one terminal to receive and/or detect a downlink signal over the first object and/or at least one second object. The network side device transmits the downlink signal over the first object and/or the at least one second object. After the terminal in the sleep state receives the wake-up signal over the first object, the terminal is woken up, and the wake-up terminal receives and/or detects the downlink signal over the first object and/or at least one second object according to information in the wake-up signal.

Because the wake-up signal is only transmitted over the first carrier or the first bandwidth, that is, the wake-up signal is only configured on the first carrier or the first bandwidth, and at least one terminal receives and/or detects the downlink signal over the first carrier and/or first bandwidth and/or at least one second carrier and/or at least one second bandwidth according to instruction in the wake-up signal, so the terminal can receive the downlink signal over a corresponding carrier or bandwidth, thereby saving resources, causing total spectrum resources available in the downlink to be continuous, reducing terminal power consumption, and avoiding omission of receiving and/or detecting a downlink signal.

The terminal is a device with a wireless communication function, can be deployed on land, and includes an indoor or outdoor, handheld or vehicle-mounted terminal. The terminal can also be deployed on a water surface (such as a ship) or deployed in the air (such as on an airplane, balloon and satellite). The terminal may be a mobile phone, a tablet computer (pad), a computer with a wireless transceiving function, a virtual reality (VR) terminal, an augmented reality (AR) terminal, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, etc. The terminal may also be user equipment (UE) in various forms, a mobile station (MS), and a terminal device.

The network side device is a device that provides a wireless communication function for the terminal, includes but is not limited to: a gNB in 5G, a radio network controller (RNC), node B (NB) a base station controller (BSC), a base transceiver station (BTS), a home base station (e.g. home evolved node B, or home node B, HNB), a baseband unit (BBU), a transmitting and receiving point (TRP), a transmitting point (TP), a mobile switching center, etc. The network side device in the present application may also be a device that provides a wireless communication function for the terminal in other communication systems that may appear in the future.

To make the objects, technical solutions and advantages of the present application more apparent, the present application will be described in further detail in conjunction with the drawings. Obviously, the described embodiments are only a part of embodiments of the present invention, but not all the embodiments. On the basis of the embodiments in the present application, all other embodiments obtained by those of ordinary skill in the art without inventive efforts fall within the protection scope of the present application.

Figure 5:
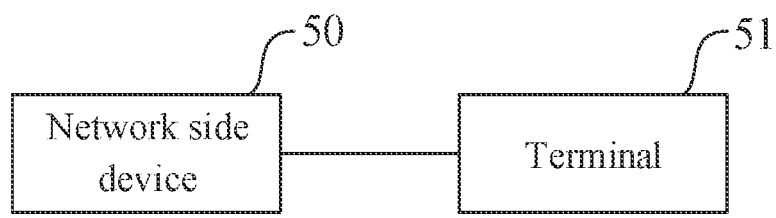
FIG. 5 illustrates a schematic structural diagram of a system for transmitting and receiving a signal according to an embodiment of the present application.

In view of the above scenario, FIG. 5 illustrates a schematic structural diagram of a system for transmitting and receiving a signal according to an embodiment of the present application. Specifically, as shown in FIG. 5, the system includes: a network side device 50 and a terminal 51.

The network side device 50 is configured to transmit a wake-up signal over at least one first object, wherein the wake-up signal includes information for instructing at least one terminal to receive and/or detect a downlink signal over the first object and/or at least one second object; and transmit the downlink signal over the first object and/or at least one second object, wherein the first object and the second object are different, and the object is a carrier or a bandwidth.

The terminal 51 is configured to enter a wake-up state after receiving a wake-up signal transmitted by the network side device over a first object; and receive and/or detect a downlink signal over the first object and/or at least one second object, according to information, for instructing the terminal to receive and/or detect the downlink signal over the first object and/or the at least one second object, in the wake-up signal; wherein the first object and the second object are different, and the object is a carrier or a bandwidth.

In the embodiments of the present application, the network side device transmits a wake-up signal over at least one first object, wherein the wake-up signal includes information for instructing at least one terminal to receive and/or detect a downlink signal over the first object and/or at least one second object; and the terminal enters a wake-up state after receiving the wake-up signal transmitted by the network side device over the first object. The network side device transmits a downlink signal over the first object and/or the at least one second object, and the terminal receives and/or detects the downlink signal over the first object and/or at least one second object according to instruction in the wake-up signal. The wake-up signal includes information for instructing at least one terminal to receive and/or detect a downlink signal over the first object and/or second object, and the terminal can determine an object for receiving and/or detecting the downlink signal according to the information in the wake-up signal, so the network side device only needs to transmit a wake-up signal over the first object and does not need to transmit a wake-up signal on each object, thereby reducing resource waste, causing total spectrum resources available in the downlink to be continuous, reducing terminal power consumption, and avoiding omission of receiving and/or detecting a downlink signal.

The network side device transmits a wake-up signal over at least one first object, wherein the wake-up signal transmitted by the network side device includes information for instructing at least one terminal to receive and/or detect a downlink signal over the first object and/or at least one second object.

The object here is a carrier or a bandwidth, wherein the carrier may be in-band or out-band, and multiple carriers may be in a CA mode or a DC mode for data transmission.

The bandwidth can be a radio frequency bandwidth or a baseband bandwidth, wherein the radio frequency bandwidth is a bandwidth supported by a corresponding independent radio frequency chain, the baseband bandwidth is the bandwidth capability of device baseband independent processing, or the bandwidth or the number of points supported by the Fourier transform processing capability.

The object is a carrier or a bandwidth, so the first object is the first carrier or the first bandwidth.

The first carrier is part or all of the following four carriers.

First, the first carrier is a primary carrier of at least one terminal, wherein the primary carrier is predefined, or statically configured by the network side device, or semi-statically configured by the network side device, or dynamically configured by the network side device.

Second, the first carrier is a secondary carrier of at least one terminal, wherein the secondary carrier is predefined, or statically configured by the network side device, or semi-statically configured by the network side device, or dynamically configured by the network side device.

Third, the first carrier is at least one carrier where a licensed spectrum is located, wherein the at least one carrier is predefined, or statically configured by the network side device, or semi-statically configured by the network side device, or dynamically configured by the network side device.

Fourth, the first carrier is at least one carrier where an unlicensed spectrum is located, wherein the at least one carrier is predefined, or statically configured by the network side device, or semi-statically configured by the network side device, or dynamically configured by the network side device.

The first bandwidth is part or all of the following three bandwidths.

First, the first bandwidth is an initial access bandwidth of at least one terminal, wherein the initial access bandwidth is predefined, or statically configured by the network side device, or semi-statically configured by the network side device, or dynamically configured by the network side device.

Second, the first bandwidth is a partial bandwidth of an available bandwidth of at least one terminal, wherein the partial bandwidth of the available bandwidth is predefined, or statically configured by the network side device, or semi-statically configured by the network side device, or dynamically configured by the network side device.

Third, the first bandwidth is a total bandwidth of an available bandwidth of at least one terminal, wherein the total bandwidth of the available bandwidth is predefined, or statically configured by the network side device, or semi-statically configured by the network side device, or dynamically configured by the network side device.

It should be noted here that the predefinition may be as follows: before the terminal leaves the factory, the terminal and the network side device agree that the primary carrier is the first carrier, and then such information is preset in the terminal and the network side device.

The static configuration or semi-static configuration mentioned above may be configured by the network side device via radio resource control information, or configured by a control unit of a media access control layer; and dynamic configuration may be configured by the network side device via downlink control information.

In addition to the above-mentioned static configuration, semi-static configuration and dynamic configuration, other static configuration, semi-static configuration, and dynamic configuration are all applicable to the embodiments of the present application.

The principle of determining the first carrier or the first bandwidth by the network side device may be randomly selected by the network side device, or the first carrier or the first bandwidth may be once used by the terminal and stored by the network side device, or may be obtained by the network side device according to a RRM measurement result.

An optional implementation is that the principle of determining the first carrier or the first bandwidth by the network side device may be uniformly random selection.

The uniformly random selection here is that the probability of each selected random event satisfies a uniformly random distribution.

Here, the RRM measurement result includes a measurement result of a reference signal received power, or a measurement result of a reference signal received quality, or a measurement result indicated by a received signal strength, or a measurement result of a signal interference-to-noise ratio.

There may be two modes when the network side device configures the first carrier or the first bandwidth for the terminal according to the RRM measurement result.

First, the network side device configures the first carrier or the first bandwidth for the terminal according to a value in the RRM measurement result.

Here, the values in the RRM measurement result include a maximum value and a minimum value.

In the embodiments of the present application, the RRM measurement result includes part or all of the following measurement results:

a measurement result of a reference signal received power, a measurement result of a reference signal received quality, a measurement result indicated by a received signal strength, and a measurement result of a signal interference-to-noise ratio.

If the RRM measurement result is the measurement result indicated by the received signal strength, the first carrier or first bandwidth is configured for the terminal according to the minimum value in the measurement result, for example, the carrier or the bandwidth corresponding to the minimum value in the measurement result can be configured for the terminal, as the first carrier or the first bandwidth.

If the RRM measurement result is one of the measurement result of the reference signal received power, the measurement result of the reference signal received quality, or the measurement result of the signal interference-to-noise ratio, the first carrier or the first bandwidth is configured for the terminal according to the maximum value in the measurement result, for example, the carrier or the bandwidth corresponding to the maximum value in the measurement result can be configured for the terminal, as the first carrier or the first bandwidth.

Second, the network side device configures the first carrier or the first bandwidth for the terminal according to a measurement result which is not less than a threshold value in the RRM measurement result.

In this mode of configuring the first carrier or the bandwidth for the terminal, a threshold value is first set, and then the network side device compares the RRM measurement result with the threshold value, and configures the first carrier or the first bandwidth for the terminal according to a comparison result.

In the RRM measurement, if it is a received signal strength indication, a measurement result that is less than the threshold value can be selected as the first carrier or the first bandwidth; if it is received energy, a measurement result that is not less than the threshold value can be selected as the first carrier or the first bandwidth.

In the embodiments of the present application, the RRM measurement result includes part or all of the following measurement results:
  a measurement result of a reference signal received power, a measurement result of a reference signal received quality, a measurement result indicated by a received signal strength, and a measurement result of a signal interference-to-noise ratio.

For the measurement result indicated by the received signal strength, the first carder or the first bandwidth is configured for the terminal according to the measurement result that is less than the threshold value, for example, the carrier or the bandwidth corresponding to the measurement result that is less than the threshold value can be configured for the terminal, as the first carrier or the first bandwidth.

When the first carrier or the first bandwidth is configured for the terminal according to the measurement result that is less than the threshold value, there may be multiple measurement results that are less than the threshold value. In this case, one or more of the measurement results that are less than the threshold value may be randomly selected to configure the first carrier or the first bandwidth for one or more terminals.

For the measurement result of the reference signal received power, the measurement result of the reference signal received quality, and the measurement result of the signal interference-to-noise ratio, the first carrier or the first bandwidth is configured for the terminal according to the measurement result that is not less than the threshold value, for example, the carrier or the bandwidth corresponding to the measurement result that is not less than the threshold value can be configured for the terminal, as the first carrier or the first bandwidth.

When the first carrier or the first bandwidth is configured for the terminal according to the measurement result that is not less than the threshold value, there may be multiple measurement results that are not less than the threshold value. In this case, one or more of the measurement results that are not less than the threshold value may be randomly selected to configure the first carrier or first bandwidth for one or more terminals.

After determining, the first carrier or the first bandwidth, the network side device transmits a wake-up signal over the first carrier or the first bandwidth.

The wake-up signal transmitted by the network side device includes information for instructing at least one terminal to receive and/or detect a downlink signal over the first object and/or at least one second object.

It should be noted that the first object and the second object are different. The first object can be either an object to which the network side device transmits a wake-up signal, or an object to which the network side device transmits a downlink signal; and the second object is an object to which the network side device transmits a downlink signal.

The information in the wake-up signal here may instruct at least one terminal to receive and/or detect a downlink signal over the first object and/or at least one second object. That is to say, the number of terminals instructed by the wake-up signal may be one or more, and the first object of each terminal may be the same or different. The object instructed by the wake-up signal to receive and/or detect the downlink signal may be the object that transmits the wake-up signal, or may be one or more objects different from the object that transmits the wake-up signal.

For example, if the object that transmits the wake-up signal is a carrier 1, the terminals instructed by the wake-up signal are a terminal UE1 and a terminal UE2, the second object corresponding to the terminal UE1 is the carrier 1, and the second objects corresponding to the terminal UE2 are a carrier 2 and a carrier 3. Then the information in the wake-up signal instructs that the terminal UE1 receives and/or detects the downlink signal transmitted by the network side device over the carrier 1, and the terminal UE2 receives and/or detects the downlink signal transmitted by the network side device over the carrier 2 and the carrier 3. That is, the terminal UE1 receives and/or detects the downlink signal transmitted by the network side device over the carrier 1, and the terminal UE2 receives and/or detects the downlink signal transmitted by the network side device over the carrier 2 and the carrier 3.

If there are multiple terminals instructed in one wake-up signal, the first objects of the multiple terminals are the same, that is, the carriers or bandwidths for receiving the wake-up signal of multiple terminals instructed in the wake-up signal are the same.

For example, if the object that transmits the wake-up signal is a carrier 1, and the terminals instructed by the wake-up signal are a terminal UE1 and a terminal UE2, it means that the first object of the terminal UE1 and the first object of the terminal UE2 are the same, and both are the carrier 1.

In the embodiments of the present application, the terminal may be in two states, one is an idle state and the other is a connected state. The information in the wake-up signal will be described in the two states, respectively.

The carrier transmitting the WUS is a primary carrier, and the carrier transmitting the downlink signal is the primary carrier and/or a secondary carrier.
  1. In a radio resource control (RRC)-idle/inactive state, when a network configuration terminal enters the idle state/inactive state, at least one terminal is instructed in the WUS to be woken up, and the primary carrier of each terminal may be different. When one of all the carriers of the terminal needs to receive and/or detect a downlink signal, the network side device transmits the WUS over the primary carrier of the terminal, and the downlink signal here includes a paging signal, a RRM measurement, etc.

The WUS is transmitted on all primary carriers to instruct the terminal to wake up. Further, the WUS instructs whether the terminal needs to receive and/or detect a downlink signal over all carriers, and all the carriers here include primary carriers and secondary carrier.

Figure 6:
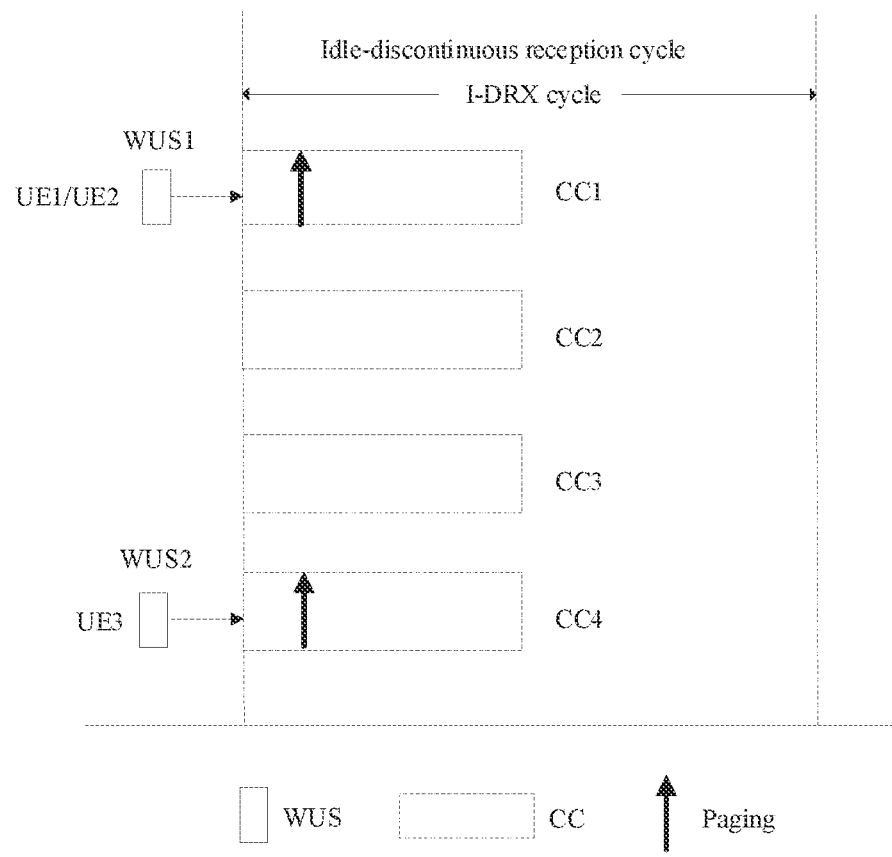
FIG. 6 illustrates a schematic diagram of first WUS instruction in a multi-carrier RRC-idle or RRC-inactive state according to an embodiment of the present application.

The following description is made in conjunction with the drawings. FIG. 6 illustrates a schematic diagram of first WUS instruction in a multi-carrier RRC-idle or RRC-inactive state.

In FIG. 6, a WUS instructs one or more terminals to receive and/or detect a paging signal. A WUS1 instructs two terminals to receive and/or detect a paging signal over the same carrier, that is, the WUS1 instructs a terminal UE1 and a terminal UE2 to receive and/or detect the paging signal over a carrier CC1.

A WUS2 instructs one terminal to receive and/or detect a paging signal on one carrier, that is, the WUS2 instructs a terminal UE3 to receive and/or detect the paging signal over a carrier CC4.

Figure 7:
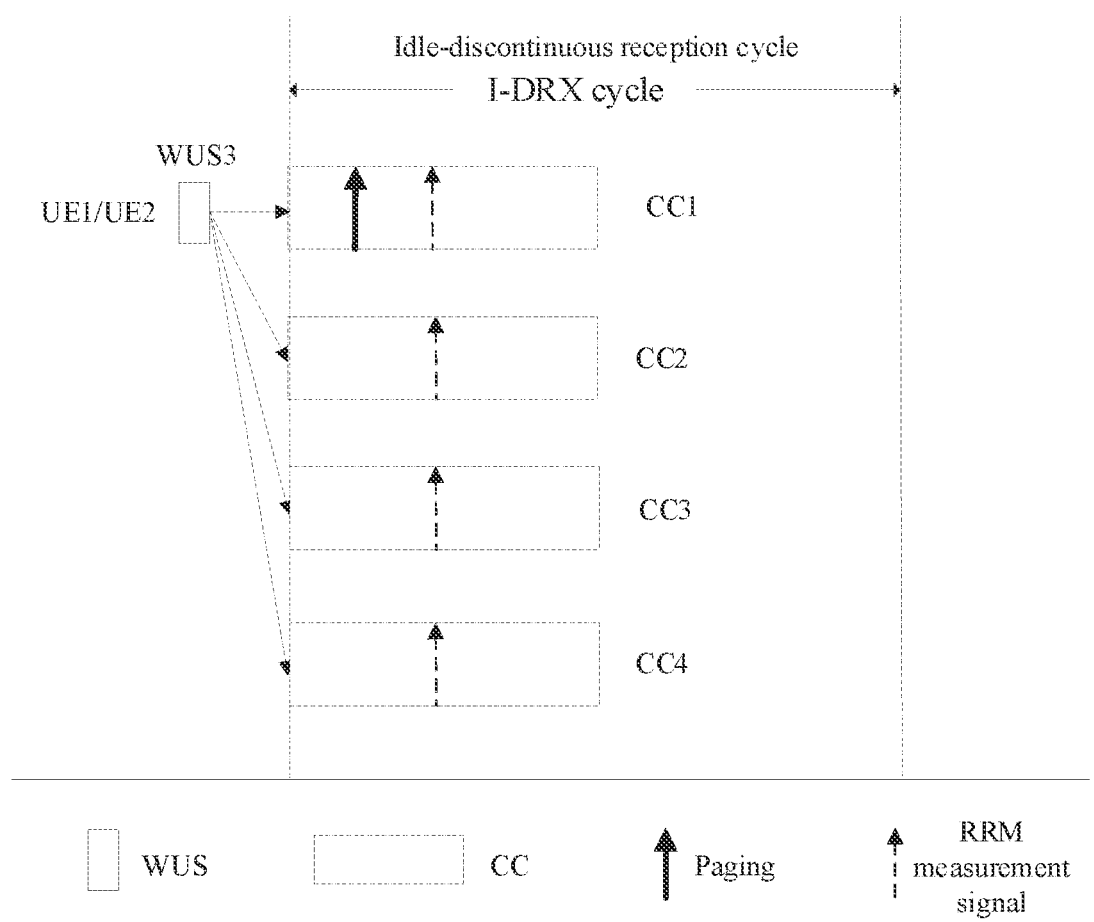
FIG. 7 illustrates a schematic diagram of second WUS instruction in a multi-carrier RRC-idle or RRC-inactive state according to an embodiment of the present application.

FIG. 7 illustrates a schematic diagram of second WUS instruction in a multi-carrier RRC-idle or RRC-inactive state.

In FIG. 7, a WUS instructs multiple terminals to receive and/or detect different downlink signals over multiple carriers. A WUS3 instructs a terminal UE1 and a terminal UE2 to receive and/or detect a paging signal and a RRM measurement signal over a carrier CC1, receive and/or detect a RRM measurement signal over a carrier CC2, receive and/or detect a RRM measurement signal over a carrier CC3, and receive and/or detect a RRM measurement signal over a carrier CC4.

2. In a RRC-Connected state, when a network configuration terminal enters the connected state/inactive state, at least one terminal is instructed in the WUS to be woken up, and the primary carrier of each terminal may be different. When one of all the carriers of the terminal needs to receive and/or detect a downlink signal, the network side device transmits the WUS over the primary carrier of the terminal, and the downlink signal here includes a PDCCH signal, a RRM measurement, etc.

The WUS is transmitted on all primary carriers to instruct the terminal to wake up. Further, the WUS instructs whether the terminal needs to receive and/or detect a downlink signal over all carriers, and all the carriers here include primary carriers and secondary carriers.

An optional mode is that the first carrier is a primary carrier, and when the first carrier is the primary carrier, the WUS is transmitted over the primary carrier. The first carrier may also be a secondary carrier, and when the first carrier is the secondary carrier, the WUS is transmitted over the secondary carrier.

Figure 8:
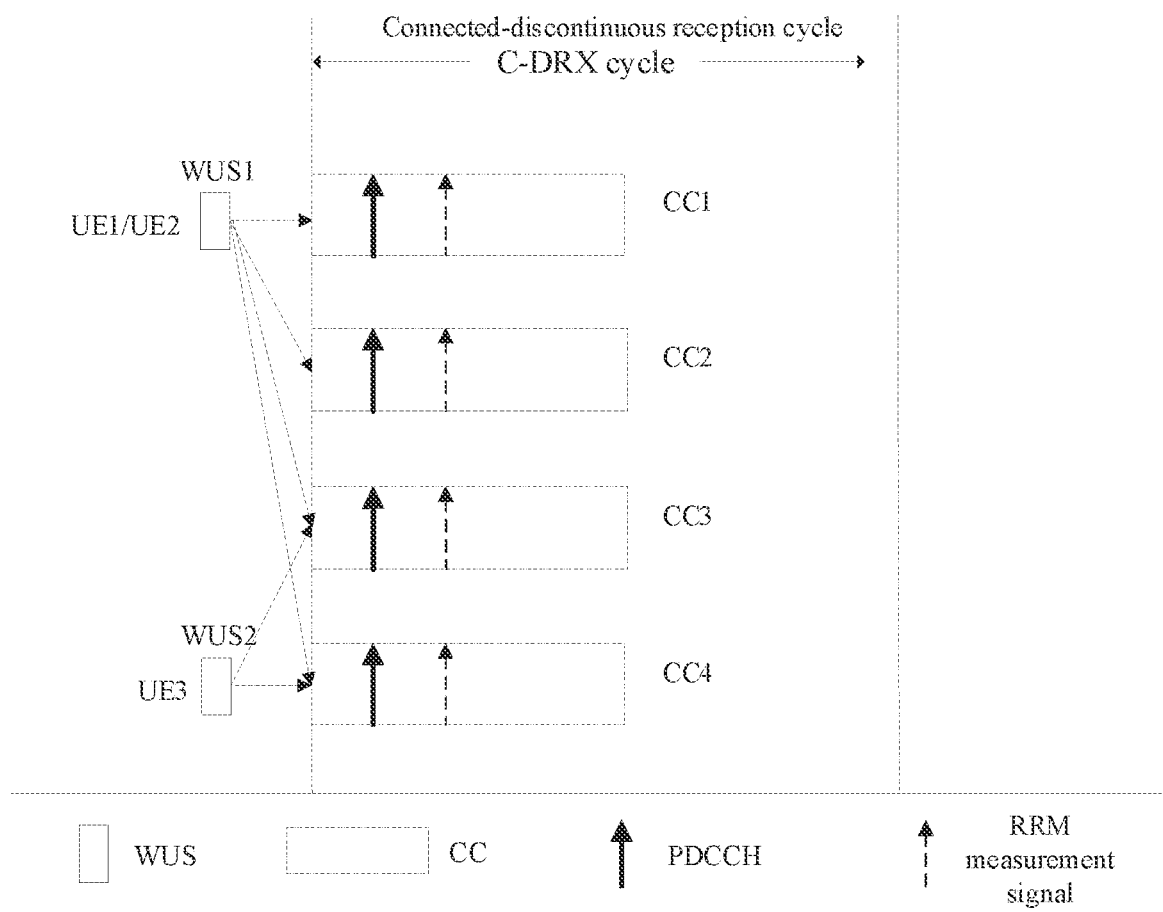
FIG. 8 illustrates a schematic diagram of first WUS instruction in a multi-carrier RRC-connected state according to an embodiment of the present application.

The following description is made in conjunction with the drawings. FIG. 8 illustrates a schematic diagram of first WUS instruction in a multi-carrier RRC-connected state.

In FIG. 8, a WUS instructs different terminals to receive and/or detect same downlink signals over different carriers. A WUS1 instructs two terminals UE1 and UE2 to receive and/or detect a PDCCH signal and a RRM measurement signal over a carrier CC1, receive and/or detect a PDCCH signal and a RRM measurement signal over a carrier CC2, receive and/or detect a PDCCH signal and a RRM measurement signal over a carrier CC3, receive and/or detect a PDCCH signal and a RRM measurement signal over a carrier CC4.

Figure 9:
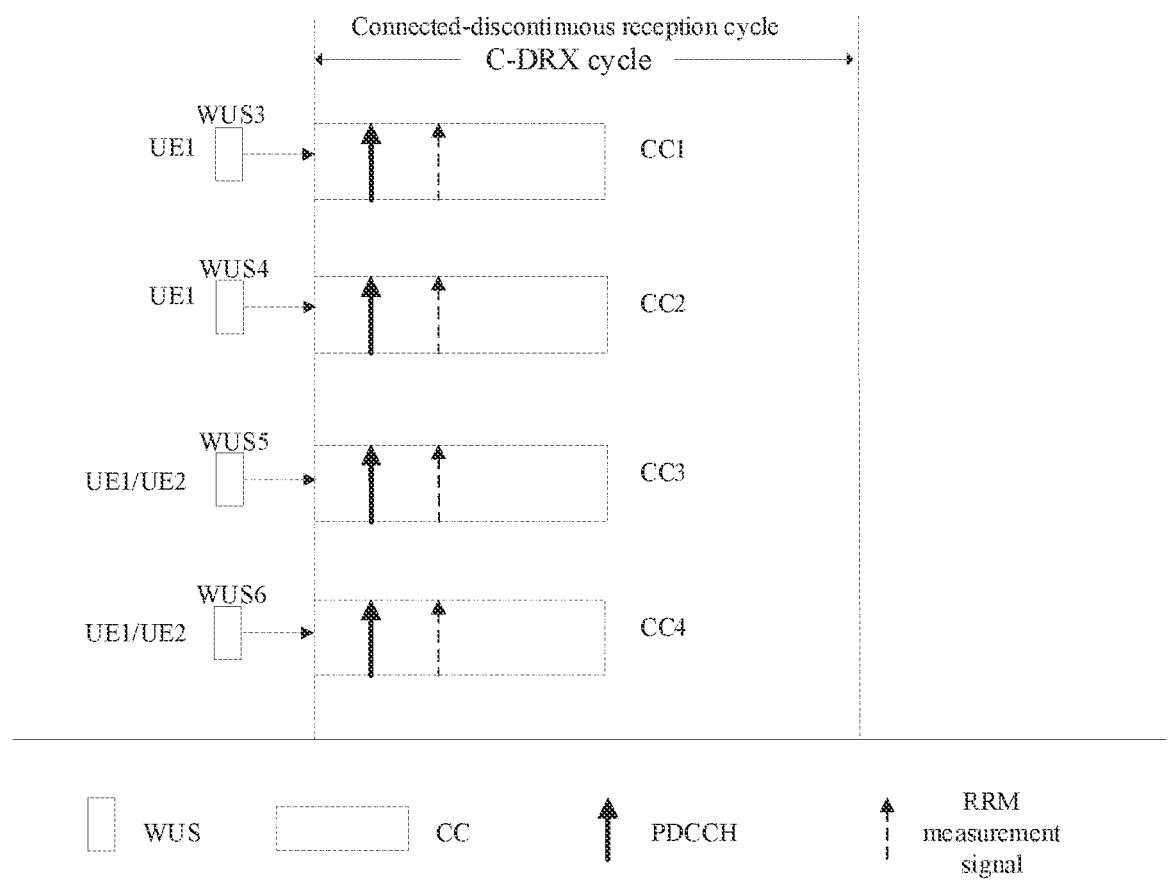
FIG. 9 illustrates a schematic diagram of second WUS instruction in a multi-carder RRC-connected state according to an embodiment of the present application.

FIG. 9 illustrates a schematic diagram of second WUS instruction in a multi-carrier RRC-connected state.

If the same terminal receives and/or detects the same downlink signal over different carriers, the terminal may be instructed in different wake-up signals to receive and/or detect the downlink signal.

In FIG. 9, when a terminal UE1 receives and/or detects a PDCCH signal and a RRM measurement signal over a carrier CC1 and a carrier CC2, two wake-up signals can be used for instruction: a wake-up signal WUS3 and a wake-up signal WUS4. The WUS3 is used to instruct the terminal UE1 to receive and/or detect the PDCCH signal and the RRM measurement signal over the carrier CC1, and the WUS4 is used to instruct the terminal UE1 to receive and/or detect the PDCCH signal and the RRM measurement signal over the carrier CC2.

When the multiple terminals receive and/or detect the same downlink signal over different carriers, the multiple terminals may also be instructed in different wake-up signals to receive and/or detect the downlink signal.

In FIG. 9, when a terminal UE1 and a terminal UE2 receive and/or detect the PDCCH signal and the RRM measurement signal over a carrier CC3 and a carrier CC4, two wake-up signals are used for instruction: a wake-up signal WUS5 and a wake-up signal WUS6. The WUS5 is used to instruct the terminal UE1 and the terminal UE2 to receive and/or detect the PDCCH signal and the RRM measurement signal over the carrier CC3, and the WUS6 is used to instruct the terminal UE1 and the terminal UE2 to receive and/or detect the PDCCH signal and the RRM measurement signal over the carrier CC4.

After determining a first object, the network side device transmits object information of the determined first object to a terminal. After receiving the object information of the first object transmitted by the network side device, the terminal determines the first object in a set of all available receiving carriers of the terminal, or determines the first object in a set of all available receiving bandwidths of the terminal.

Correspondingly, the first object of the terminal is the first carrier or the first bandwidth.

Because the first object of the terminal is determined according to the object information transmitted by the network side, the first carrier of the terminal is part or all of the following four carriers.

First, the first carrier is a primary carrier of at least one terminal, wherein the primary carrier is predefined, or statically configured by the network side device, or semi-statically configured by the network side device, or dynamically configured by the network side device.

Second, the first carrier is a secondary carrier of at least one terminal, wherein the secondary carrier is predefined, or statically configured by the network side device, or semi-statically configured by the network side device, or dynamically configured by the network side device.

Third, the first carrier is at least one carrier where a licensed spectrum is located, wherein the at least one carrier is predefined, or statically configured by the network side device, or semi-statically configured by the network side device, or dynamically configured by the network side device.

Fourth, the first carrier is at least one carrier where an unlicensed spectrum is located, wherein the at least one carrier is predefined, or statically configured by the network side device, or semi-statically configured by the network side device, or dynamically configured by the network side device.

Because the first object of the terminal is determined according to the object information transmitted by the network side, the first bandwidth of the terminal is part or all of the following three bandwidths.

First, the first bandwidth is an initial access bandwidth of at least one terminal, wherein the initial access bandwidth is predefined, or statically configured by the network side device, or semi-statically configured by the network side device, or dynamically configured by the network side device.

Second, the first bandwidth is a partial bandwidth of an available bandwidth of at least one terminal, wherein the partial bandwidth of the available bandwidth is predefined, or statically configured by the network side device, or semi-statically configured by the network side device, or dynamically configured by the network side device.

Third, the first bandwidth is a total bandwidth of an available bandwidth of at least one terminal, wherein the total bandwidth of the available bandwidth is predefined, or statically configured by the network side device, or semi-statically configured by the network side device, or dynamically configured by the network side device.

Here, the static configuration or the semi-static configuration is configured by the network side device via RRM control information, and the dynamic configuration is configured by the network side device via downlink control information.

After determining the first object, the terminal receives a wake-up signal transmitted by the network side device over the first object.

Before receiving the wake-up signal, the terminal is in a sleep state, namely a low power state. In the sleep state, the terminal cannot receive the downlink signal transmitted by the network side device, but can only receive information transmitted by the network side device, such as the object information of the first object, and a monitoring wake-up signal.

After the terminal in the sleep state receives the wake-up signal over the first object, the terminal in the sleep state is woken up.

The wake-up of the terminal here means that the terminal enters an active mode from a sleep mode, that is, the terminal is ready to receive a downlink signal.

In the embodiments of the present application, the terminal may be in two states, one is an idle state and the other is a connected state. The two states are described below, respectively.

1. In a RRC-idle/inactive state, when a network configuration terminal enters the idle state/inactive state, the terminal enters the sleep mode. The terminal entering the sleep mode only receives the wake-up signal transmitted by the network side device. After the terminal receives the wake-up signal, the terminal enters the active mode, and is ready to receive a paging signal, and/or a RRM measurement signal, and/or a synchronization signal.

2. In a RRC-Connected state, when the network configuration terminal enters the connected state/inactive state, the terminal enters the sleep mode. The terminal entering the sleep mode only receives the wake-up signal transmitted by the network side device. After the terminal receives the wake-up signal, the terminal enters the active mode, and is ready to receive and/or detect a PDCCH signal, and/or a RRM measurement signal, and/or a synchronization signal.

After transmitting the wake-up signal to the terminal, the network side device transmits a downlink signal over the first object and/or at least one second object.

The first object and/or at least one second object here correspond to the first object and/or at least one second object included in the wake-up signal transmitted by the network side device.

For example, the information included in the wake-up signal transmitted by the network side device to the terminal is that the terminal is UE1, and the carriers are a carrier A and a carrier B, then the network side device transmits a downlink signal to the terminal UE1 over the carrier A and the carrier B.

The network side device transmits a wake-up signal to the terminal over the first object, and transmits a downlink signal over the first object and/or at least one second object, so that a set of all available receiving objects configured by the network side device to the terminal includes at least one first object and/or at least one second object.

That is to say, when the object is a carrier, a set of all available receiving carriers configured by the network side device to the terminal includes at least one first carrier and/or at least one second carrier. When the object is a bandwidth, a set of all available receiving bandwidths configured by the network side device to the terminal includes at least one first bandwidth and/or at least one second bandwidth.

Correspondingly, if the object is a carrier, a set of all available receiving carriers of the terminal includes at least one first carrier and/or at least one second carrier. If the object is a bandwidth, a set of all available receiving bandwidths of the terminal includes at least one first bandwidth and/or at least one second bandwidth.

The network side device transmits a wake-up signal over at least one first object, the terminal in the sleep state receives the wake-up signal over the first object, the terminal in the sleep state is woken up, and the network side device transmits a downlink signal over the first object and/or at least one second object.

The first object and/or second object here is a first object and/or at least one second object included in the wake-up signal transmitted by the network side device to the terminal.

The downlink signal here includes a paging signal, a PDCCH signal, a RRM measurement signal, and a synchronization signal, etc.

When a state of the terminal is the RRC-idle/inactive state, the downlink signal is a paging signal, a RRM measurement signal, a synchronization signal and the like; when a state of the terminal is the RRC-Connected state, the downlink signal is a PDCCH signal, a RRM measurement signal, a synchronization signal and the like.

The network side device transmits a downlink signal over the first object and/or the at least one second object, and the terminal receives and/or detects the downlink signal over the first object and/or at least one second object, according to information, for instructing the terminal to receive and/or detect the downlink signal over the first object and/or the at least one second object, in the received wake-up signal.

For example, the network side device transmits a downlink signal over a carrier 1, and the wake-up signal instructs a terminal UE1 to receive a paging signal over the carrier 1, then the terminal UE1 determines to receive the paging information over the carrier 1 according to information in the wake-up signal.

On the basis of the same inventive concept, an embodiment of the present application further provides a device for transmitting a signal. The device is a network side device in the system for transmitting and receiving a signal in an embodiment of the present application, and the principle of the device for solving the problem is similar to that of the system. Therefore, the implementation of the device can refer to the implementation of the system, and repeated description is omitted here.

Figure 10:
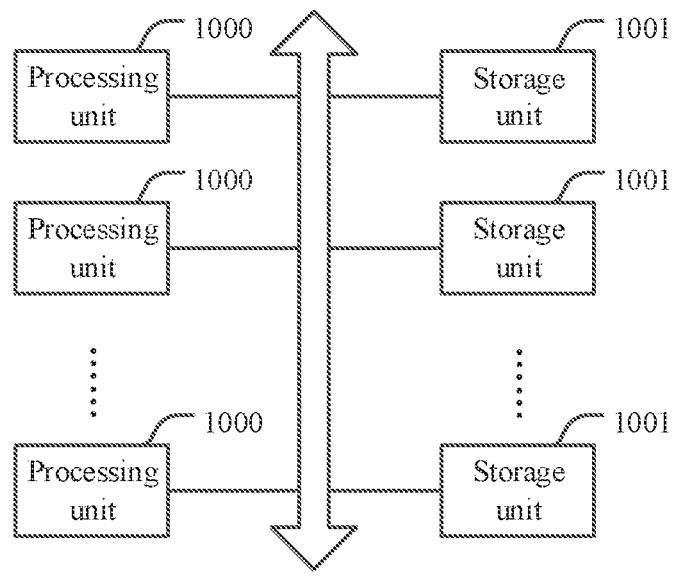
FIG. 10 illustrates a schematic structural diagram of a first network side device according to an embodiment of the present application.

As shown in FIG. 10, an embodiment of the present application provides a device for transmitting a signal, and the device includes: at least one processing unit 1000 and at least one storage unit 1001, wherein the storage unit 1001 stores a program code, and when the program code is executed by the processing unit 1000, the processing unit 1000 executes the following processes:

transmitting a wake-up signal over at least one first object, wherein the wake-up signal includes information for instructing at least one terminal to receive and/or detect a downlink signal over the first object and/or at least one second object; and transmitting the downlink signal over the first object and/or at least one second object;

wherein the first object and the second object are different, and the object is a carrier or a bandwidth.

Optionally, the processing unit 1000 is specifically used:
the object is the carrier, and a set of all available receiving carriers configured by the network side to the terminal includes at least one first carrier and/or at least one second carrier;
or, the object is the bandwidth, and a set of all available receiving bandwidths configured by the network side to the terminal includes at least one first bandwidth and/or at least one second bandwidth.

Optionally, the processing unit 1000 is specifically used:
the first carrier is a primary carrier of the at least one terminal, wherein the primary carrier is predefined, or statically configured by the network side device, or semi-statically configured by the network side device, or dynamically configured by the network side device;
or, the first carrier is a secondary carrier of the at least one terminal, wherein the secondary carrier is predefined, or statically configured by the network side device, or semi-statically configured by the network side device, or dynamically configured by the network side device;
or, the first carrier is at least one carrier where a licensed spectrum is located, wherein the at least one carrier is predefined, or statically configured by the network side device, or semi-statically configured by the network side device, or dynamically configured by the network side device;
or, the first carrier is at least one carrier where an unlicensed spectrum is located, wherein the at least one carrier is predefined, or statically configured by the network side device, or semi-statically configured by the network side device, or dynamically configured by the network side device;
or, the first bandwidth is an initial access bandwidth of the at least one terminal, wherein the initial access bandwidth is predefined, or statically configured by the network side device, or semi-statically configured by the network side device, or dynamically configured by the network side device;
or, the first bandwidth is a partial bandwidth of an available bandwidth of the at least one terminal, wherein the partial bandwidth of the available bandwidth is predefined, or statically configured by the network side device, or semi-statically configured by the network side device, or dynamically configured by the network side device;
or, the first bandwidth is a total bandwidth of an available bandwidth of the at least one terminal, wherein the total bandwidth of the available bandwidth is predefined, or statically configured by the network side device, or semi-statically configured by the network side device, or dynamically configured by the network side device.

Optionally, the static configuration or the semi-static configuration is configured by the network side device via radio resource control information, and the dynamic configuration is configured by the network side device via downlink control information.

Optionally, the processing unit 1000 is further configured to:
configure the first carrier or the first bandwidth for the terminal in a randomly selected manner, or configure the first carrier or the first bandwidth for the terminal according to a RRM measurement result.

Optionally, the RRM measurement result includes one of the following information measurement results:
a measurement result of a reference signal received power, a measurement result of a reference signal received quality, a measurement result indicated by a received signal strength, or a measurement result of a signal interference-to-noise ratio.

Optionally, the processing unit 1000 is specifically configured to:
configure the first carrier or the first bandwidth for the terminal according to a value in the RRM measurement result; or configure the first carrier or the first bandwidth for the terminal according to a result of comparing the RRM measurement result with a threshold value.

Optionally, the processing unit 1000 is further configured to:
transmit object information of the determined first object to the terminal.

On the basis of the same inventive concept, an embodiment of the present application further provides a device for transmitting a signal. The device is a terminal in the system for transmitting and receiving a signal in an embodiment of the present application, and the principle of the device for solving the problem is similar to that of the system. Therefore, the implementation of the device can refer to the implementation of the system, and repeated description is omitted here.

Figure 11:
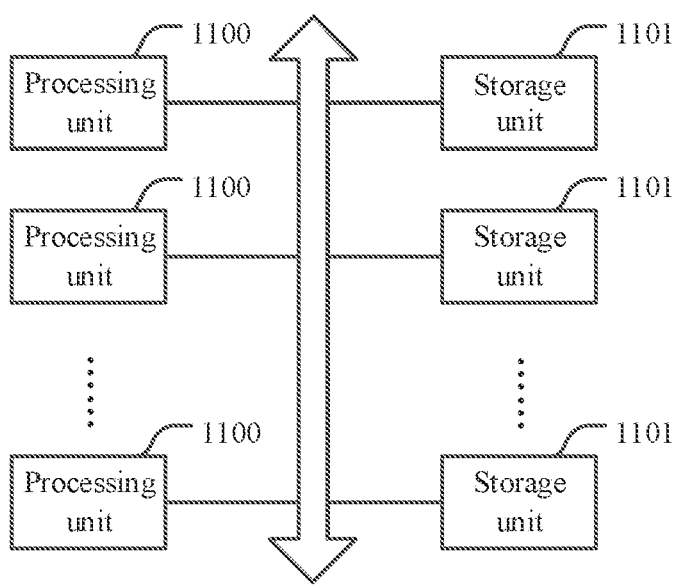
FIG. 11 illustrates a schematic structural diagram of a first terminal according to an embodiment of the present application.

As shown in FIG. 11, an embodiment of the present application provides a device for transmitting a signal, and the device includes: at least one processing unit 1100 and at least one storage unit 1101, wherein the storage unit 1101 stores a program code, and when the program code is executed by the processing unit 1100, the processing unit 1100 executes the following processes:

entering a wake-up state after receiving a wake-up signal transmitted by a network side device over a first object; and receiving and/or detecting a downlink signal over the first object and/or at least one second carrier, according to information, for instructing the terminal to receive and/or detect the downlink signal over the first object and/or at least one second object, in the wake-up signal;

wherein the first object and the second object are different, and the object is a carrier or a bandwidth.

Optionally, the processing unit 1100 is specifically used:
the object is the carrier, and a set of all available receiving carriers configured by the network side to the terminal includes at least one first carrier and/or at least one second carrier;
or, the object is the bandwidth, and a set of all available receiving bandwidths configured by the network side to the terminal includes at least one first bandwidth and/or at least one second bandwidth.

Optionally, the processing unit 1100 is specifically used:
the first carrier is a primary carrier of the terminal, wherein the primary carrier is predefined, or statically configured by the network side device, or semi-statically configured by the network side device, or dynamically configured by the network side device;
or, the first carrier is a secondary carrier of the terminal, wherein the secondary carrier is predefined, or statically configured by the network side device, or semi-statically configured by the network side device, or dynamically configured by the network side device;
or, the first carrier is at least one carrier where a licensed spectrum is located, wherein the at least one carrier is predefined, or statically configured by the network side device, or semi-statically configured by the network side device, or dynamically configured by the network side device;
or, the first carrier is at least one carrier where an unlicensed spectrum is located, wherein the at least one carrier is predefined, or statically configured by the network side device, or semi-statically configured by the network side device, or dynamically configured by the network side device;
or, the first bandwidth is an initial access bandwidth of the terminal, wherein the initial access bandwidth is predefined, or statically configured by the network side device, or semi-statically configured by the network side device, or dynamically configured by the network side device;
or, the first bandwidth is a partial bandwidth of an available bandwidth of the terminal, wherein the partial bandwidth of the available bandwidth is predefined, or statically configured by the network side device, or semi-statically configured by the network side device, or dynamically configured by the network side device;
or, the first bandwidth is a total bandwidth of an available bandwidth of the terminal, wherein the total bandwidth of the available bandwidth is predefined, or statically configured by the network side device, or semi-statically configured by the network side device, or dynamically configured by the network side device.

Optionally, the static configuration or the semi-static configuration is configured by the network side device via radio resource control information, and the dynamic configuration is configured by the network side device via downlink control information.

Optionally, the processing unit 1100 is specifically configured to:
determine the first object in the following manner:
determining the first object in the set of all available receiving carriers of the terminal according to the received object information transmitted by the network side device; or determining the first object in the set of all available receiving bandwidths of the terminal according to the received object information transmitted by the network side device.

On the basis of the same inventive concept, an embodiment of the present application further provides a device for transmitting a signal. The device is a network side device in the system for transmitting and receiving a signal in an embodiment of the present application, and the principle of the device for solving the problem is similar to that of the system. Therefore, the implementation of the device can refer to the implementation of the system, and repeated description is omitted here.

Figure 12:
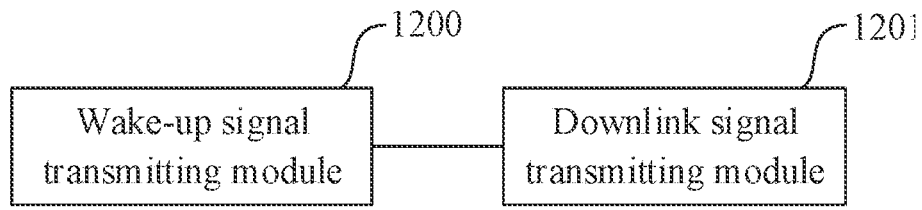
FIG. 12 illustrates a schematic structural diagram of a second network side device according to an embodiment of the present disclosure.

As shown in FIG. 12, an embodiment of the present application provides a device for transmitting a signal, and the device includes a wake-up signal transmitting module 1200 and a downlink signal transmitting module 1201:
the wake-up signal transmitting module 1200 is configured to transmit a wake-up signal over at least one first object, wherein the wake-up signal includes information for instructing at least one terminal to receive and/or detect a downlink signal over the first object and/or at least one second object; and
the downlink signal transmitting module 1201 is configured to transmit the downlink signal over the first object and/or the at least one second object;
wherein the first object and the second object are different, and the object is a carrier or a bandwidth.

Optionally, the wake-up signal transmitting module 1200 is specifically used:
the object is the carrier, and a set of all available receiving carriers configured by the network side to the terminal includes at least one first carrier and/or at least one second carrier;
or, the object is the bandwidth, and a set of all available receiving bandwidths configured by the network side to the terminal includes at least one first bandwidth and/or at least one second bandwidth.

Optionally, the wake-up signal transmitting module 1200 is specifically used:
the first carrier is a primary carrier of the at least one terminal, wherein the primary carrier is predefined, or statically configured by the network side device, or semi-statically configured by the network side device, or dynamically configured by the network side device;
or, the first carrier is a secondary carrier of the at least one terminal, wherein the secondary carrier is predefined, or statically configured by the network side device, or semi-statically configured by the network side device, or dynamically configured by the network side device;
or, the first carrier is at least one carrier where a licensed spectrum is located, wherein the at least one carrier is predefined, or statically configured by the network side device, or semi-statically configured by the network side device, or dynamically configured by the network side device;
or, the first carrier is at least one carrier where an unlicensed spectrum is located, wherein the at least one carrier is predefined, or statically configured by the network side device, or semi-statically configured by the network side device, or dynamically configured by the network side device;
or, the first bandwidth is an initial access bandwidth of the at least one terminal, wherein the initial access bandwidth is predefined, or statically configured by the network side device, or semi-statically configured by the network side device, or dynamically configured by the network side device;
or, the first bandwidth is a partial bandwidth of an available bandwidth of the at least one terminal, wherein the partial bandwidth of the available bandwidth is predefined, or statically configured by the network side device, or semi-statically configured by the network side device, or dynamically configured by the network side device;

or, the first bandwidth is a total bandwidth of an available bandwidth of the at least one terminal, wherein the total bandwidth of the available bandwidth is predefined, or statically configured by the network side device, or semi-statically configured by the network side device, or dynamically configured by the network side device.

Optionally, the static configuration or the semi-static configuration is configured by the network side device via radio resource control information, and the dynamic configuration is configured by the network side device via downlink control information.

Optionally, the wake-up signal transmitting module 1200 is further configured to:

configure the first carrier or the first bandwidth for the terminal in a randomly selected manner, or configure the first carrier or the first bandwidth for the terminal according to a RRM measurement result.

Optionally, the RRM measurement result includes one of the following information measurement results:

a measurement result of a reference signal received power, a measurement result of a reference signal received quality, a measurement result indicated by a received signal strength, or a measurement result of a signal interference-to-noise ratio.

Optionally, the wake-up signal transmitting module 1200 is specifically configured to:

configure the first carrier or the first bandwidth for the terminal according to a value in the RRM measurement result; or configure the first carrier or the first bandwidth for the terminal according to a result of comparing the RRM measurement result with a threshold value.

Optionally, the wake-up signal transmitting module 1200 is further configured to:

transmit object information of the determined first object to the terminal.

On the basis of the same inventive concept, an embodiment of the present application further provides a device for transmitting a signal. The device is a terminal in the system for transmitting and receiving a signal in an embodiment of the present application, and the principle of the device for solving the problem is similar to that of the system. Therefore, the implementation of the device can refer to the implementation of the system, and repeated description is omitted here.

Figure 13:
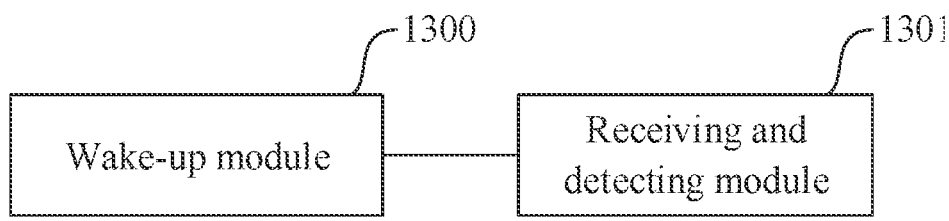
FIG. 13 illustrates a schematic structural diagram of a second terminal according to an embodiment of the present application.

As shown in FIG. 13, an embodiment of the present application provides a device for transmitting a signal, and the device includes a wake-up module 1300 and a receiving and detecting module 1301:

the wake-up module 1300 is configured to enter a wake-up state after receiving a wake-up signal transmitted by a network side device over a first object; and the receiving and/or detecting module 1301 is configured to receive and/or detect a downlink signal over the first object and/or at least one second carrier, according to information, for instructing the terminal to receive and/or detect the downlink signal over the first object and/or at least one second object, in the wake-up signal;

wherein the first object and the second object are different, and the object is a carrier or a bandwidth.

Optionally, the wake-up module 1300 is specifically used: the object is the carrier, and a set of all available receiving carriers configured by the network side to the terminal includes at least one first carrier and/or at least one second carrier;

or, the object is the bandwidth, and a set of all available receiving bandwidths configured by the network side to the terminal includes at least one first bandwidth and/or at least one second bandwidth.

Optionally, the wake-up module 1300 is specifically used: the first carrier is a primary carrier of the terminal, wherein the primary carrier is predefined, or statically configured by the network side device, or semi-statically configured by the network side device, or dynamically configured by the network side device;

or, the first carrier is a secondary carrier of the terminal, wherein the secondary carrier is predefined, or statically configured by the network side device, or semi-statically configured by the network side device, or dynamically configured by the network side device;

or, the first carrier is at least one carrier where a licensed spectrum is located, wherein the at least one carrier is predefined, or statically configured by the network side device, or semi-statically configured by the network side device, or dynamically configured by the network side device;

or, the first carrier is at least one carrier where an unlicensed spectrum is located, wherein the at least one carrier is predefined, or statically configured by the network side device, or semi-statically configured by the network side device, or dynamically configured by the network side device;

or, the first bandwidth is an initial access bandwidth of the terminal, wherein the initial access bandwidth is predefined, or statically configured by the network side device, or semi-statically configured by the network side device, or dynamically configured by the network side device;

or, the first bandwidth is a partial bandwidth of an available bandwidth of the terminal, wherein the partial bandwidth of the available bandwidth is predefined, or statically configured by the network side device, or semi-statically configured by the network side device, or dynamically configured by the network side device;

or, the first bandwidth is a total bandwidth of an available bandwidth of the terminal, wherein the total bandwidth of the available bandwidth is predefined, or statically configured by the network side device, or semi-statically configured by the network side device, or dynamically configured by the network side device.

Optionally, the static configuration or the semi-static configuration is configured by the network side device via radio resource control information, and the dynamic configuration is configured by the network side device via downlink control information.

Optionally, the wake-up module 1300 is specifically configured to:

determine the first object in the following manner:

determining the first object in the set of all available receiving carriers of the terminal according to the received object information transmitted by the network side device; or determining the first object in the set of all available receiving bandwidths of the terminal according to the received object information transmitted by the network side device.

On the basis of the same inventive concept, an embodiment of the present application further provides a method for transmitting a signal. The device corresponding to the method is a network side device in the system for transmitting and receiving a signal in an embodiment of the present application, and the principle of the method for solving the problem is similar to that of the device. Therefore, the implementation of the method can refer to the implementation of the system, and repeated description is omitted here.

An embodiment of the present application further provides a computer-readable non-volatile storage medium, including a program code. When the program code runs on a computing device, the program code is configured to cause the computing device to execute steps of the method for transmitting a signal on the network side device side in the system according to an embodiment of the present application.

An embodiment of the present application further provides a computer-readable non-volatile storage medium, including a program code. When the program code runs on a computing device, the program code is configured to cause the computing device to execute steps of the method for transmitting a signal on the terminal side in the system according to an embodiment of the present application.

Figure 14:
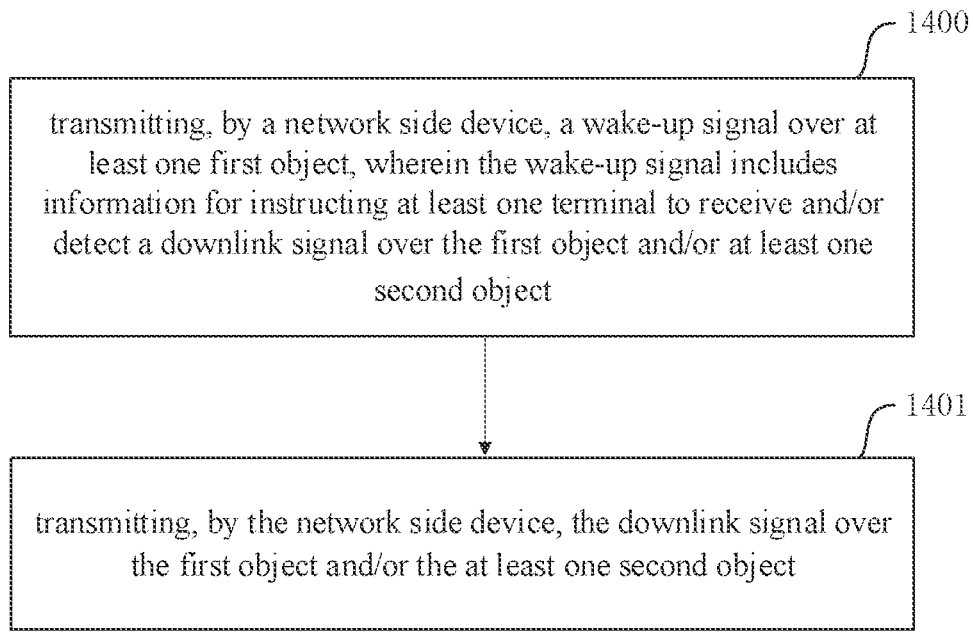
FIG. 14 illustrates a flow chart of a method at a network side device side in a method for transmitting and receiving a signal according to an embodiment of the present application.

As shown in FIG. 14, an embodiment of the present application provides a method for transmitting a signal, and the method includes:
step 1400, transmitting, by a network side device, a wake-up signal over at least one first object, wherein the wake-up signal includes information for instructing at least one terminal to receive and/or detect a downlink signal over the first object and/or at least one second object; and
step 1401, transmitting, by the network side device, the downlink signal over the first object and/or the at least one second object.

The first object and the second object are different, and the object is a carrier or a bandwidth.

Optionally, the object is the carrier, and a set of all available receiving carriers configured by the network side device to the terminal includes at least one first carrier and/or at least one second carrier;
or, the object is the bandwidth, and a set of all available receiving bandwidths configured by the network side device to the terminal includes at least one first bandwidth and/or at least one second bandwidth.

Optionally, the first carrier is a primary carrier of the at least one terminal, wherein the primary carrier is predefined, or statically configured by the network side device, or semi-statically configured by the network side device, or dynamically configured by the network side device;
or, the first carrier is a secondary carrier of the at least one terminal, wherein the secondary carrier is predefined, or statically configured by the network side device, or semi-statically configured by the network side device, or dynamically configured by the network side device;
or, the first carrier is at least one carrier where a licensed spectrum is located, wherein the at least one carrier is predefined, or statically configured by the network side device, or semi-statically configured by the network side device, or dynamically configured by the network side device;
or, the first carrier is at least one carrier where an unlicensed spectrum is located, wherein the at least one carrier is predefined, or statically configured by the network side device, or semi-statically configured by the network side device, or dynamically configured by the network side device;
or, the first bandwidth is an initial access bandwidth of the at least one terminal, wherein the initial access bandwidth is predefined, or statically configured by the network side device, or semi-statically configured by the network side device, or dynamically configured by the network side device;
or, the first bandwidth is a partial bandwidth of an available bandwidth of the at least one terminal, wherein the partial bandwidth of the available bandwidth is predefined, or statically configured by the network side device, or semi-statically configured by the network side device, or dynamically configured by the network side device;
or, the first bandwidth is a total bandwidth of an available bandwidth of the at least one terminal, wherein the total bandwidth of the available bandwidth is predefined, or statically configured by the network side device, or semi-statically configured by the network side device, or dynamically configured by the network side device.

Optionally, the static configuration or the semi-static configuration is configured by the network side device via radio resource control information; and
the dynamic configuration is configured by the network side device via downlink control information.

Optionally, the method further includes:
configuring, by the network side device, the first carrier or the first bandwidth for the terminal in a randomly selected manner;
or, configuring, by the network side device, the first carrier or the first bandwidth for the terminal according to a RRM measurement result.

Optionally, the RRM measurement result includes one of the following information measurement results:
a measurement result of a reference signal received power, a measurement result of a reference signal received quality, a measurement result indicated by a received signal strength, or a measurement result of a signal interference-to-noise ratio.

Optionally, the configuring, by the network side device, of the first carrier or the first bandwidth for the terminal according to the RRM measurement result, includes:
configuring, by the network side device, the first carrier or the first bandwidth for the terminal according to a value in the RRM measurement result;
or configuring, by the network side device, the first carrier or the first bandwidth for the terminal according to a result of comparing the RRM measurement result with a threshold value.

Optionally, after the network side device determines the first object, the method further includes:
transmitting, by the network side device, object information of the determined first object to the terminal.

On the basis of the same inventive concept, an embodiment of the present application further provides a method for receiving a signal. The device corresponding to the method is a terminal in the system for transmitting and receiving a signal in an embodiment of the present application, and the principle of the method for solving the problem is similar to that of the device. Therefore, the implementation of the method can refer to the implementation of the system, and repeated description is omitted here.

Figure 15:
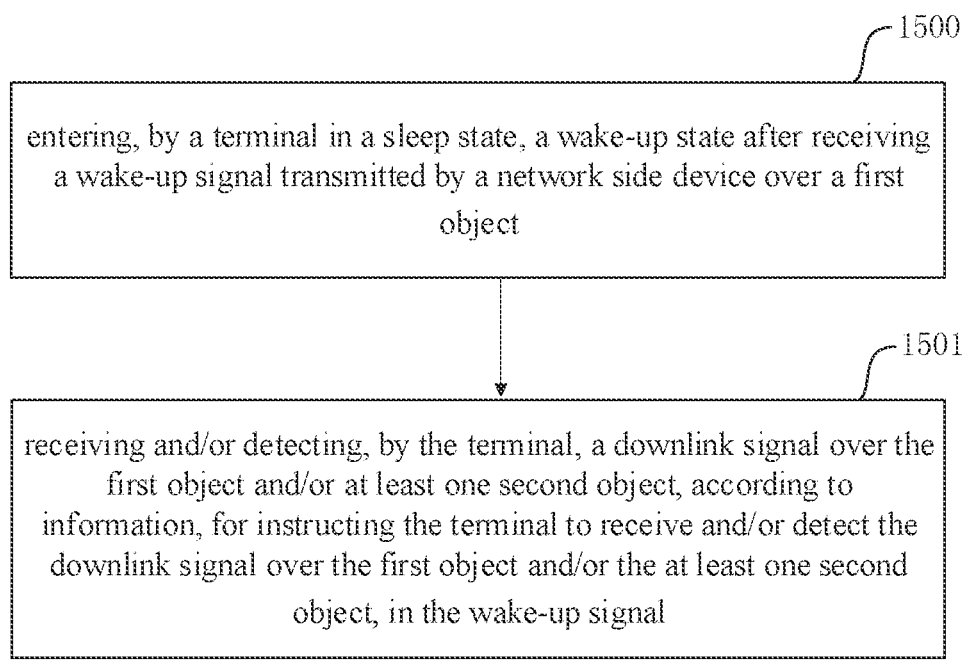
FIG. 15 illustrates a flow chart of a method at a terminal side in a method for transmitting and receiving a signal according to an embodiment of the present application.

As shown in FIG. 15, an embodiment of the present application provides a method for receiving a signal, and the method includes:
step 1500, entering, by a terminal in a sleep state, a wake-up state after receiving a wake-up signal transmitted by a network side device over a first object; and
step 1501, receiving and/or detecting, by the terminal, a downlink signal over the first object and/or at least one second object, according to information, for instructing the terminal to receive and/or detect the downlink signal over the first object and/or the at least one second object, in the wake-up signal.

The first object and the second object are different, and the object is a carrier or a bandwidth.

Optionally, the object is the carrier, and a set of all available receiving carriers configured by the network side device to the terminal includes at least one first carrier and/or at least one second carrier;

or the object is the bandwidth, and a set of all available receiving bandwidths configured by the network side device to the terminal includes at least one first bandwidth and/or at least one second bandwidth.

Optionally, the first carrier is a primary carrier of the terminal, wherein the primary carrier is predefined, or statically configured by the network side device, or semi-statically configured by the network side device, or dynamically configured by the network side device;

or, the first carrier is a secondary carrier of the terminal, wherein the secondary carrier is predefined, or statically configured by the network side device, or semi-statically configured by the network side device, or dynamically configured by the network side device;

or, the first carrier is at least one carrier where a licensed spectrum is located, wherein the at least one carrier is predefined, or statically configured by the network side device, or semi-statically configured by the network side device, or dynamically configured by the network side device;

or, the first carrier is at least one carrier where an unlicensed spectrum is located, wherein the at least one carrier is predefined, or statically configured by the network side device, or semi-statically configured by the network side device, or dynamically configured by the network side device;

or, the first bandwidth is an initial access bandwidth of the terminal, wherein the initial access bandwidth is predefined, or statically configured by the network side device, or semi-statically configured by the network side device, or dynamically configured by the network side device;

or, the first bandwidth is a partial bandwidth of an available bandwidth of the terminal, wherein the partial bandwidth of the available bandwidth is predefined, or statically configured by the network side device, or semi-statically configured by the network side device, or dynamically configured by the network side device;

or, the first bandwidth is a total bandwidth of an available bandwidth of the terminal, wherein the total bandwidth of the available bandwidth is predefined, or statically configured by the network side device, or semi-statically configured by the network side device, or dynamically configured by the network side device.

Optionally, the static configuration or the semi-static configuration is configured by the network side device via radio resource control information, and the dynamic configuration is configured by the network side device via downlink control information.

Optionally, the terminal determines the first object in one of the following manners:

determining, by the terminal, the first object in the set of all available receiving carriers of the terminal according to the received object information transmitted by the network side device; or determining, by the terminal, the first object in the set of all available receiving bandwidths of the terminal according to the received object information transmitted by the network side device.

Figure 16:
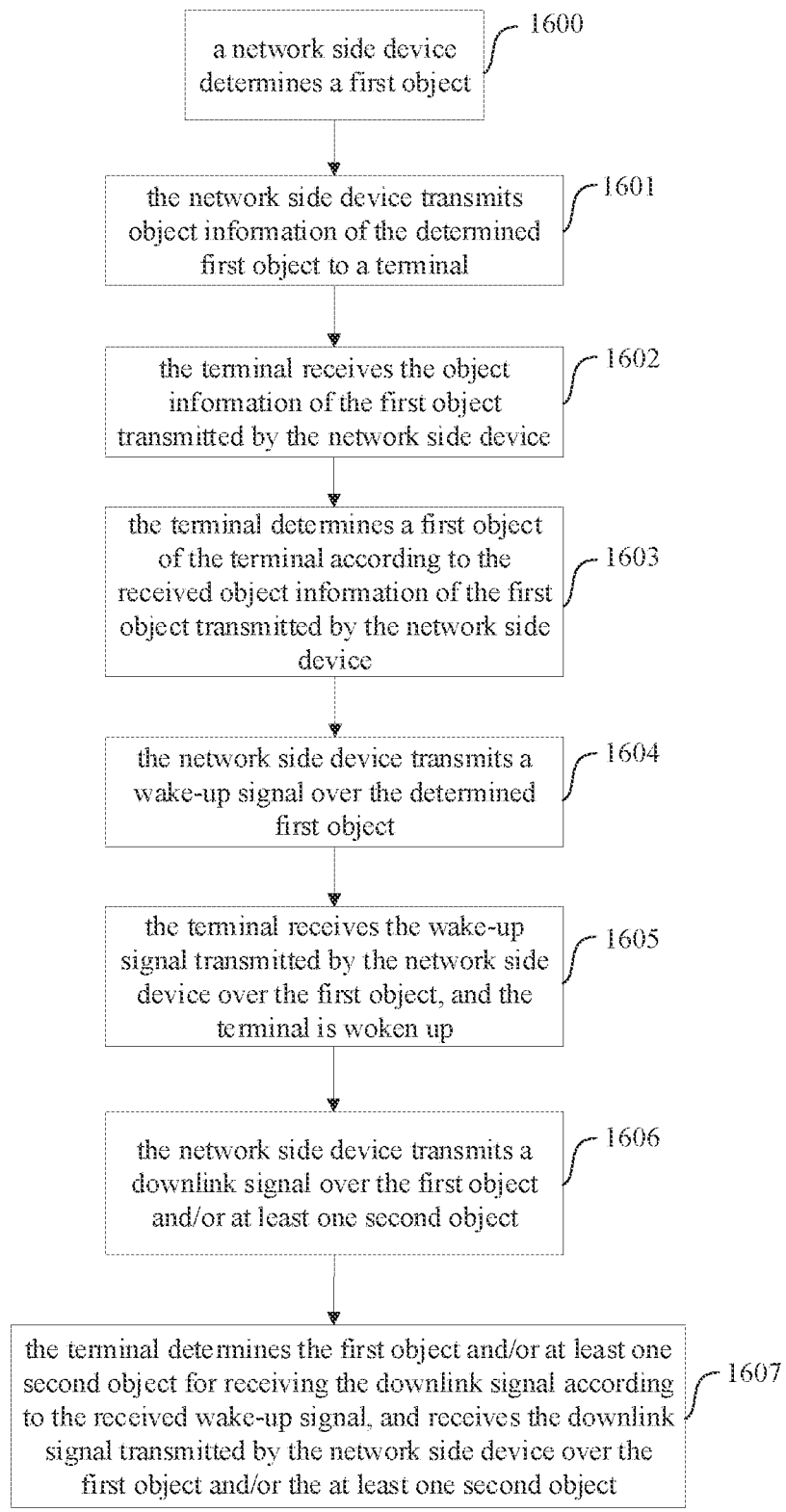
FIG. 16 illustrates a flow diagram of a complete method for transmitting and receiving a signal according to an embodiment of the present application.

As shown in FIG. 16, an embodiment of the present application provides a complete method for transmitting and receiving a signal, including the following.

Step 1600, a network side device determines a first object.

Step 1601, the network side device transmits object information of the determined first object to a terminal.

Step 1602, the terminal receives the object information of the first object transmitted by the network side device.

Step 1603, the terminal determines a first object of the terminal according to the received object information of the first object transmitted by the network side device.

Step 1604, the network side device transmits a wake-up signal over the determined first object.

Step 1605, the terminal receives the wake-up signal transmitted by the network side device over the first object, and the terminal is woken up.

Step 1606, the network side device transmits a downlink signal over the first object and/or at least one second object.

Step 1607, the terminal determines the first object and/or at least one second object for receiving the downlink signal according to the received wake-up signal, and receives the downlink signal transmitted by the network side device over the first object and/or the at least one second object.

The present application is described above with reference to block diagrams and/or flowcharts illustrating methods, devices (systems) and/or computer program products according to embodiments of the present application. It should be understood that one block of the block diagrams and/or flowcharts and a combination of blocks of the block diagrams and/or flowcharts can be implemented by computer program instructions. These computer program instructions can be provided to a processor of a general-purpose computer and a dedicated computer, and/or other programmable data processing devices to produce a machine, so that instructions executed via a computer processor and/or other programmable data processing devices create a method for implementing the functions/actions specified in the block diagrams and/or flowchart blocks.

Correspondingly, the present application can also be implemented using hardware and/or software (including firmware, resident software, microcode, etc.). Furthermore, the present application may take the form of a computer program product on a computer-usable or computer-readable storage medium, which has a computer-usable or computer-readable program code implemented in the medium for use by or in connection with an instruction execution system. In the context of the present application, a computer-usable or computer-readable medium may be any medium that can contain, store, communicate, transmit or transport the program for use by or in connection with an instruction execution system, apparatus, or device.

Obviously, those skilled in the art can make various modifications and variations to the present application without departing from the spirit and scope of the present application. In this way, if these modifications and variations of the present application fall within the scope of the claims of the present application and their equivalent art, the present application also intends to include these modifications and variations.

What is claimed is:

1. A method for transmitting a downlink signal, applied in a carrier aggregation (CA) technology, wherein the method comprises:

transmitting, by a network side device, a wake-up signal over at least one first object, wherein the wake-up signal comprises information for instructing at least one terminal to receive and/or detect the downlink signal over the first object and at least one second object; and transmitting, by the network side device, the downlink signal over the first object and the at least one second object;

wherein the first and second objects are either different component carriers or different bandwidth parts;

wherein when the object is the component carrier, a set of all available receiving carriers configured by the network side device to the terminal comprises at least one first component carrier and at least one second component carrier; or when the object is the bandwidth part, a set of all available receiving bandwidths configured by the network side device to the terminal comprises at least one first bandwidth part and at least one second bandwidth part;

wherein the transmitting, by the network side device, the wake-up signal over at least one first object, comprises:

transmitting, by the network side device, the wake-up signal over the at least one first component carrier of the set of all available receiving carriers; or, transmitting, by the network side device, the wake-up signal over the at least one first bandwidth part of the set of all available receiving bandwidths;

wherein different wake-up signals instruct a same terminal to receive and/or detect a same downlink signal over different component carriers; or different wake-up signals instruct a same terminal to receive and/or detect a same downlink signal over different bandwidth parts.

2. The method according to claim 1, wherein the first component carrier is a primary component carrier of the at least one terminal, wherein the primary component carrier is predefined, or statically configured by the network side device, or semi-statically configured by the network side device, or dynamically configured by the network side device; or the first component carrier is a secondary component carrier of the at least one terminal, wherein the secondary component carrier is predefined, or statically configured by the network side device, or semi-statically configured by the network side device, or dynamically configured by the network side device; or the first component carrier is at least one component carrier where a licensed spectrum is located, wherein the at least one component carrier is predefined, or statically configured by the network side device, or semi-statically configured by the network side device, or dynamically configured by the network side device; or the first component carrier is at least one component carrier where an unlicensed spectrum is located, wherein the at least one component carrier is predefined, or statically configured by the network side device, or semi-statically configured by the network side device, or dynamically configured by the network side device; or the first bandwidth part is an initial access bandwidth of the at least one terminal, wherein the initial access bandwidth is predefined, or statically configured by the network side device, or semi-statically configured by the network side device, or dynamically configured by the network side device; or the first bandwidth part is a partial bandwidth of an available bandwidth of the at least one terminal, wherein the partial bandwidth of the available bandwidth is predefined, or statically configured by the network side device, or semi-statically configured by the network side device, or dynamically configured by the network side device; or the first bandwidth part is a total bandwidth of an available bandwidth of the at least one terminal, wherein the total bandwidth of the available bandwidth is predefined, or statically configured by the network side device, or semi-statically configured by the network side device, or dynamically configured by the network side device.

3. The method according to claim 2, wherein the static configuration or the semi-static configuration is configured by the network side device via radio resource control information; and the dynamic configuration is configured by the network side device via downlink control information.

4. The method according to claim 2, further comprising:

configuring, by the network side device, the first component carrier or the first bandwidth part for the terminal in a randomly selected manner; or configuring, by the network side device, the first component carrier or the first bandwidth part for the terminal according to a radio resource management (RRM) measurement result.

5. The method according to claim 4, wherein the RRM measurement result comprises one of following information measurement results:

a measurement result of a reference signal received power, a measurement result of a reference signal received quality, a measurement result indicated by a received signal strength, or a measurement result of a signal interference-to-noise ratio.

6. The method according to claim 4, wherein the configuring, by the network side device, of the first component carrier or the first bandwidth part for the terminal according to the RRM measurement result, comprises:

configuring, by the network side device, the first component carrier or the first bandwidth part for the terminal according to a value in the RRM measurement result; or configuring, by the network side device, the first component carrier or the first bandwidth part for the terminal according to a result of comparing the RRM measurement result with a threshold value.

7. The method according to claim 4, wherein after the network side device determines the first object, the method further comprises:

transmitting, by the network side device, object information of the determined first object to the terminal.

8. A method for receiving a downlink signal, applied in a carrier aggregation (CA) technology, wherein the method comprises:

entering, by a terminal in a sleep state, a wake-up state after receiving a wake-up signal transmitted by a network side device over a first object; and receiving and/or detecting, by the terminal, the downlink signal over the first object and at least one second object, according to information, for instructing the terminal to receive and/or detect the downlink signal over the first object and the at least one second object, in the wake-up signal;

wherein the first and second objects are either different component carriers or different bandwidth parts;

wherein when the object is the component carrier, a set of all available receiving carriers configured by the network side device to the terminal comprises at least one first component carrier and at least one second component carrier; or when the object is the bandwidth part, a set of all available receiving bandwidths configured by the network side device to the terminal comprises at least one first bandwidth part and at least one second bandwidth part;

wherein the entering, by the terminal in the sleep state, the wake-up state after receiving the wake-up signal transmitted by the network side device over the first object, comprises:

entering, by the terminal in the sleep state, the wake-up state after receiving the wake-up signal transmitted by the network side device over the at least one first component carrier of the set of all available receiving carriers; or, entering, by the terminal in the sleep state, the wake-up state after receiving the wake-up signal transmitted by the network side device over the at least one first bandwidth part of the set of all available receiving bandwidths;

wherein different wake-up signals instruct a same terminal to receive and/or detect a same downlink signal over different component carriers; or different wake-up signals instruct a same terminal to receive and/or detect a same downlink signal over different bandwidth parts.

9. The method according to claim 8, wherein the first component carrier is a primary component carrier of the terminal, wherein the primary component carrier is predefined, or statically configured by the network side device, or semi-statically configured by the network side device, or dynamically configured by the network side device; or the first component carrier is a secondary component carrier of the terminal, wherein the secondary component carrier is predefined, or statically configured by the network side device, or semi-statically configured by the network side device, or dynamically configured by the network side device; or the first component carrier is at least one component carrier where a licensed spectrum is located, wherein the at least one component carrier is predefined, or statically configured by the network side device, or semi-statically configured by the network side device, or dynamically configured by the network side device; or the first component carrier is at least one component carrier where an unlicensed spectrum is located, wherein the at least one component carrier is predefined, or statically configured by the network side device, or semi-statically configured by the network side device, or dynamically configured by the network side device; or the first bandwidth part is an initial access bandwidth of the terminal, wherein the initial access bandwidth is predefined, or statically configured by the network side device, or semi-statically configured by the network side device, or dynamically configured by the network side device; or the first bandwidth part is a partial bandwidth of an available bandwidth of the terminal, wherein the partial bandwidth of the available bandwidth is predefined, or statically configured by the network side device, or semi-statically configured by the network side device, or dynamically configured by the network side device; or the first bandwidth part is a total bandwidth of an available bandwidth of the terminal, wherein the total bandwidth of the available bandwidth is predefined, or statically configured by the network side device, or semi-statically configured by the network side device, or dynamically configured by the network side device.

10. The method according to claim 9, wherein the static configuration or the semi-static configuration is configured by the network side device via radio resource control information; and the dynamic configuration is configured by the network side device via downlink control information.

11. The method according to claim 8, wherein the terminal determines the first object in one of following manners:

determining, by the terminal, the first object in the set of all available receiving carriers of the terminal according to received object information transmitted by the network side device; or determining, by the terminal, the first object in the set of all available receiving bandwidths of the terminal according to received object information transmitted by the network side device.

12. A device for transmitting a downlink signal, applied in a carrier aggregation (CA) technology, wherein the device comprises:

at least one processing unit; and at least one storage unit;

wherein the storage unit stores a program code, and when the program code is executed by the processing unit, the processing unit executes following processes:

transmitting a wake-up signal over at least one first object, wherein the wake-up signal comprises information for instructing at least one terminal to receive and/or detect the downlink signal over the first object and at least one second object; and transmitting the downlink signal over the first object and at least one second object;

wherein the first and second objects are either different component carriers or different bandwidth parts;

wherein when the object is the component carrier, a set of all available receiving carriers configured by the network side device to the terminal comprises at least one first component carrier and at least one second component carrier; or when the object is the bandwidth part, a set of all available receiving bandwidths configured by the network side device to the terminal comprises at least one first bandwidth part and at least one second bandwidth part;

wherein the processing unit is further configured to execute:

transmitting the wake-up signal over the at least one first component carrier of the set of all available receiving carriers; or, transmitting the wake-up signal over the at least one first bandwidth part of the set of all available receiving bandwidths;

wherein different wake-up signals instruct a same terminal to receive and/or detect a same downlink signal over different component carriers; or different wake-up signals instruct a same terminal to receive and/or detect a same downlink signal over different bandwidth parts.

13. The device according to claim 12, wherein
the first component carrier is a primary component carrier of the at least one terminal, wherein the primary component carrier is predefined, or statically configured by the network side device, or semi-statically configured by the network side device, or dynamically configured by the network side device; or the first component carrier is a secondary component carrier of the at least one terminal, wherein the secondary component carrier is predefined, or statically configured by the network side device, or semi-statically configured by the network side device, or dynamically configured by the network side device; or the first component carrier is at least one component carrier where a licensed spectrum is located, wherein the at least one component carrier is predefined, or statically configured by the network side device, or semi-statically configured by the network side device, or dynamically configured by the network side device; or the first component carrier is at least one component carrier where an unlicensed spectrum is located, wherein the at least one component carrier is predefined, or statically configured by the network side device, or semi-statically configured by the network side device, or dynamically configured by the network side device; or the first bandwidth part is an initial access bandwidth of the at least one terminal, wherein the initial access bandwidth is predefined, or statically configured by the network side device, or semi-statically configured by the network side device, or dynamically configured by the network side device; or the first bandwidth part is a partial bandwidth of an available bandwidth of the at least one terminal, wherein the partial bandwidth of the available bandwidth is predefined, or statically configured by the network side device, or semi-statically configured by the network side device, or dynamically configured by the network side device; or the first bandwidth part is a total bandwidth of an available bandwidth of the at least one terminal, wherein the total bandwidth of the available bandwidth is predefined, or statically configured by the network side device, or semi-statically configured by the network side device, or dynamically configured by the network side device.

14. The device according to claim 13, wherein
the static configuration or the semi-static configuration is configured by the network side device via radio resource control information; and
the dynamic configuration is configured by the network side device via downlink control information.

15. The device according to claim 13, wherein the processing unit is further configured to:
configure the first component carrier or the first bandwidth part for the terminal in a randomly selected manner; or
configure the first component carrier or the first bandwidth part for the terminal according to a radio resource management (RRM) measurement result;
wherein the processing unit is further configured to:
transmit object information of the determined first object to the terminal.

16. The device according to claim 15, wherein
the RRM measurement result comprises one of following information measurement results:
a measurement result of a reference signal received power, a measurement result of a reference signal received quality, a measurement result indicated by a received signal strength, or a measurement result of a signal interference-to-noise ratio.

17. The device according to claim 15, wherein the processing unit is specifically configured to:
configure the first component carrier or the first bandwidth part for the terminal according to a value in the RRM measurement result; or
configure the first component carrier or the first bandwidth part for the terminal according to a result of comparing the RRM measurement result with a threshold value.

* * * * *